(12) United States Patent
Tivey et al.

(10) Patent No.: US 7,599,842 B2
(45) Date of Patent: *Oct. 6, 2009

(54) SYSTEMS AND METHODS FOR ASSIGNMENT OF SALES LEADS

(75) Inventors: Steven E. Tivey, San Ramon, CA (US); Mathew F. Leahy, Merion, PA (US); Muhammad Haider, American Canyon, CA (US); Gary A. Owings, Phoenix, MD (US); Donald C. Rice, St. Charles, IL (US); Deborah K. Demello, Petaluma, CA (US)

(73) Assignee: Genworth Financial, Inc., Richmond, VA (US)

( * ) Notice: Subject to any disclaimer, the term of this patent is extended or adjusted under 35 U.S.C. 154(b) by 1119 days.

This patent is subject to a terminal disclaimer.

(21) Appl. No.: 10/602,923

(22) Filed: Jun. 25, 2003

(65) Prior Publication Data

US 2004/0143473 A1 Jul. 22, 2004

Related U.S. Application Data

(60) Provisional application No. 60/440,343, filed on Jan. 16, 2003.

(51) Int. Cl.
*G06Q 10/00* (2006.01)
(52) U.S. Cl. ............................................. 705/1
(58) Field of Classification Search ................ 705/1
See application file for complete search history.

(56) References Cited

U.S. PATENT DOCUMENTS

| | | | |
|---|---|---|---|
| 5,195,170 A | 3/1993 | Eberhardt | |
| 5,390,243 A | 2/1995 | Casselman et al. | |
| 5,615,121 A | 3/1997 | Babayev et al. | |
| 5,737,728 A | 4/1998 | Sisley et al. | |
| 5,930,764 A | 7/1999 | Melchione et al. | |
| 5,943,652 A | 8/1999 | Sisley et al. | |
| 5,963,911 A | 10/1999 | Walker et al. | |
| 5,966,695 A * | 10/1999 | Melchione et al. | 705/10 |
| 6,134,530 A | 10/2000 | Bunting et al. | |
| 6,324,568 B1 | 11/2001 | Diec | |
| 6,356,880 B1 | 3/2002 | Goossens et al. | |
| 6,374,241 B1 | 4/2002 | Lambert et al. | |
| 6,662,164 B1 | 12/2003 | Koppelman et al. | |

(Continued)

OTHER PUBLICATIONS

Akibia, CRM: Case Studies, Consulting: Clients, <http:/www.polaris1.com/ecrm/casestudies/citibank/default.asp>, printed Mar. 26, 2002, 2 pages.

(Continued)

*Primary Examiner*—John G Weiss
*Assistant Examiner*—Gabrielle McCormick
(74) *Attorney, Agent, or Firm*—Hunton & Williams

(57) ABSTRACT

The invention provides systems and methods for processing sales leads. Illustratively, the invention provides a method of assigning sales leads in a network environment, the sales leads relating to persons interested in effecting a purchase, the method comprising: obtaining a lead, the lead including lead information relating to a person interested in effecting a purchase; loading the lead into a lead processing portion; determining if the lead is auto-assignable; assigning the lead to a sales agent; and outputting the lead information over the network environment to a lead distribution portion, so as to be accessible to the sales agent.

27 Claims, 29 Drawing Sheets

U.S. PATENT DOCUMENTS

| | | | | |
|---|---|---|---|---|
| 6,850,895 | B2* | 2/2005 | Brodersen et al. | 705/9 |
| 7,047,206 | B1* | 5/2006 | Schultze | 705/10 |
| 2002/0026334 | A1 | 2/2002 | Igoe | |
| 2002/0035504 | A1 | 3/2002 | Dver et al. | |
| 2002/0133383 | A1 | 9/2002 | Chao | |
| 2002/0147618 | A1 | 10/2002 | Mezrah | |
| 2002/0165728 | A1 | 11/2002 | Buckenmayer | |
| 2003/0005299 | A1 | 1/2003 | Xia et al. | |
| 2003/0028507 | A1 | 2/2003 | Pauliks et al. | |
| 2003/0204421 | A1 | 10/2003 | Houle et al. | |
| 2003/0208384 | A1 | 11/2003 | Nelson | |
| 2003/0229504 | A1* | 12/2003 | Hollister | 705/1 |
| 2004/0143476 | A1 | 7/2004 | Kapadia et al. | |
| 2004/0143482 | A1 | 7/2004 | Tivey et al. | |
| 2004/0143483 | A1 | 7/2004 | Tivey et al. | |
| 2004/0143484 | A1 | 7/2004 | Kapadia et al. | |
| 2004/0225535 | A1 | 11/2004 | Bond | |
| 2006/0206362 | A1 | 9/2006 | Rudy | |

OTHER PUBLICATIONS

Siebelfans.com, What is Siebel?, <http:/www.siebelfans.com/More_on_siebel.htm>, printed Mar. 26, 2002, 3 pages.

www.netlingo.com/lookup.cfm?term=synchronization.

Business Wire. "MarketSoft's Leads Wins Call Center Solutions Editors' Choice Award". Business/Technology Editors. Business Wire. New York: Aug. 25, 1999, p. 1.

Leadtrack.com: pages documented form the Internet Archive on Jul. 21, 2001 (http://web.archive.org/web/20010806083606/leadtrack.com/screen-customer.html; http://web.archive.org/web/20011117000929/www.leadtrack.com/sysrequire.html; http://web.archive.org/web/20010806085400/leadtrack.com/screen-desktop.html; http://web.archive.org/web/20010806080042/leadtrack.comfappfeatures.html; http://web.archive.org/web/20010801185319/leadtrack.com/features.html; http://web.archive.org/web/20010811025743/leadtrack.com/reports/terr.gif.).

Leadtrack.com: pages documented form the Internet Archive on Jul. 21, 2001 (http://web.archive.org/web/20010811024757/leadtrack.com/reports/overdue.gif).

Leadtrack.com (pages documented form the Internet Archive on Jul. 21, 2001 (http://web.archive.org/web/2001 0801185659f1 eadtrack.com/faq.html).

Leadtrack.com (pages documented form the Internet Archive on Dec. 1, 2001 (http://web.archive.org/web/20011205051744/www.leadtrack.com/features.html and http://web.archive.org/web/20011224094912/www.leadtrack.com/screen-customer.html).

Siebelfans.com, Implementing Best Practices, http://www.siebel.com/call-center/workflow-automation.shtm printed Dec. 7, 2004, 2 pages.

* cited by examiner

SALES LEAD SYSTEM 10

Agent Performance Profile (Scoring Model)

ILLUSTRATIVE DISPOSITIONS OF LEADS:

Suppressed

STOP – RAPR
STOP – NQA (not qualified agent)
STOP – RACR (remove at client request)
STOP – NQHP (not qualified-permanent health reasons)
STOP - GROUP POLICY
STOP - DECEASED
DUPLICATE MAILING
INCORRECT
AGL

Application Submitted

APPLICATION SUBMITTED – PHONE SALE
APPLICATION SUBMITTED

Rework

AUTO DISPOSITION
AUTO DISP - TERMINATED AGENTS
AUTO DISP - AGED 180+
AUTO DISP - AGED 120+
AUTO DISP - AGED 90+
UNWORKED
UNSUPPRESS-A
UNSUPPRESS-B

Sleep

NAS (no appointment set)
NAS – COMPETITOR (policy with competitor)
NAS – NO CONTACT
ANI (appointment but not interested)
NO INFORMATION

| What (Criteria) | Description | Who | Processing Aspects |
|---|---|---|---|
| Territory | Territories will be assigned to each agent | Sales Manager | Change "territory" field |
| Position | A position will have a type of New Agent, Experienced Agent, Telemarketing, or other. Appropriate points will be assigned based on the type. Separate rules will specify the workload for telemarketing positions. | Sales Manager, Teleservices manager | Change "Position" field. Automated process to update from New Agent to Experienced Agent |
| Endorsement | A skill on the employee will be compared to a flag on the lead. | Sales Manager | Create field for skills |
| LCB > 0 (Lead credit balance) | Criteria will be set up so that an agent must have at least one lead credit in order to get leads in that assignment session. | Lead Processing Portion | Create criteria in Assignment Rule |
| "Group X" Leads or other specialized leads | Agent skill flag created that will be compared to the appropriate code on the leads. | Sales Manager | Create field for skills |
| Get Leads? | This flag must be true in order for an agent to get leads. | Sales Manager | Field in agent data |
| Channel | Rules will be created that always route certain leads to positions associated with alternative channels. | Lead Processing Portion | Set up special rules to route leads to a Channel |
| Lock Assignment | The flag must be set for false for the lead to be part of the assignment process. | Sales Manager, Automated in some cases | Flag associated with lead. |

Fig. 24

| What (Criteria) | Description | Who | Processing Aspects |
|---|---|---|---|
| Resurrection Date | A-lead must have a resurrection date equal to or earlier than the current date in order to be assigned. | Automated | Set through disposition |
| Release Flag | This flag must be set in order for an agent to see a lead. Released leads should not be assigned through assignment manager. | Sales Manager | Flag associated with lead. |
| Agent Profile Score | This score is updated weekly and is used to prioritize agents for the assignment of leads. | Automated | Automated process will score weekly. |
| A-Lead Conversion | Metric of how many A-leads to achieve sale | Automated | Automated |
| Appointments Seen | Value of how many appointments were seen in a given week | Automated | Automated process will calculate weekly |
| A-Lead Inventory | Amount of A-lead inventory the agent currently has | Automated | Automated process will calculate weekly |
| LCB | "Lead credit balance" | Automated | Automated process will update LCB Balance Weekly |
| % AGB | % of agent generated business (AGB) submitted | Lead Processing Portion | Weekly feed, or calculated weekly by Lead Processing Portion |

Fig. 25

| What (Criteria) | Description | Who | Processing Aspects |
|---|---|---|---|
| Default Rule | There needs to be a position in each region to which leads are assigned if no one else qualifies for the lead. | Lead Processing Portion | A rule will be added to each region or hub that will assign a lead to this person if no one else qualifies. |
| A-Lead CAP | Maximum number of A-leads | Lead Processing Portion | A rule will be added that allows an Agent to have no more than 150 A-Leads. |
| B-Lead CAP | Maximum number of B-leads | Lead Processing Portion | A rule will be added that allows an Agent to have no more than 150 B-Leads |
| A-Leads Weekly | Maximum number of A-leads allowed to be assigned to an agent in a week | Lead Processing Portion | A rule will be added that allows an agent to have no more than 20 A-Leads assigned in the current week. |

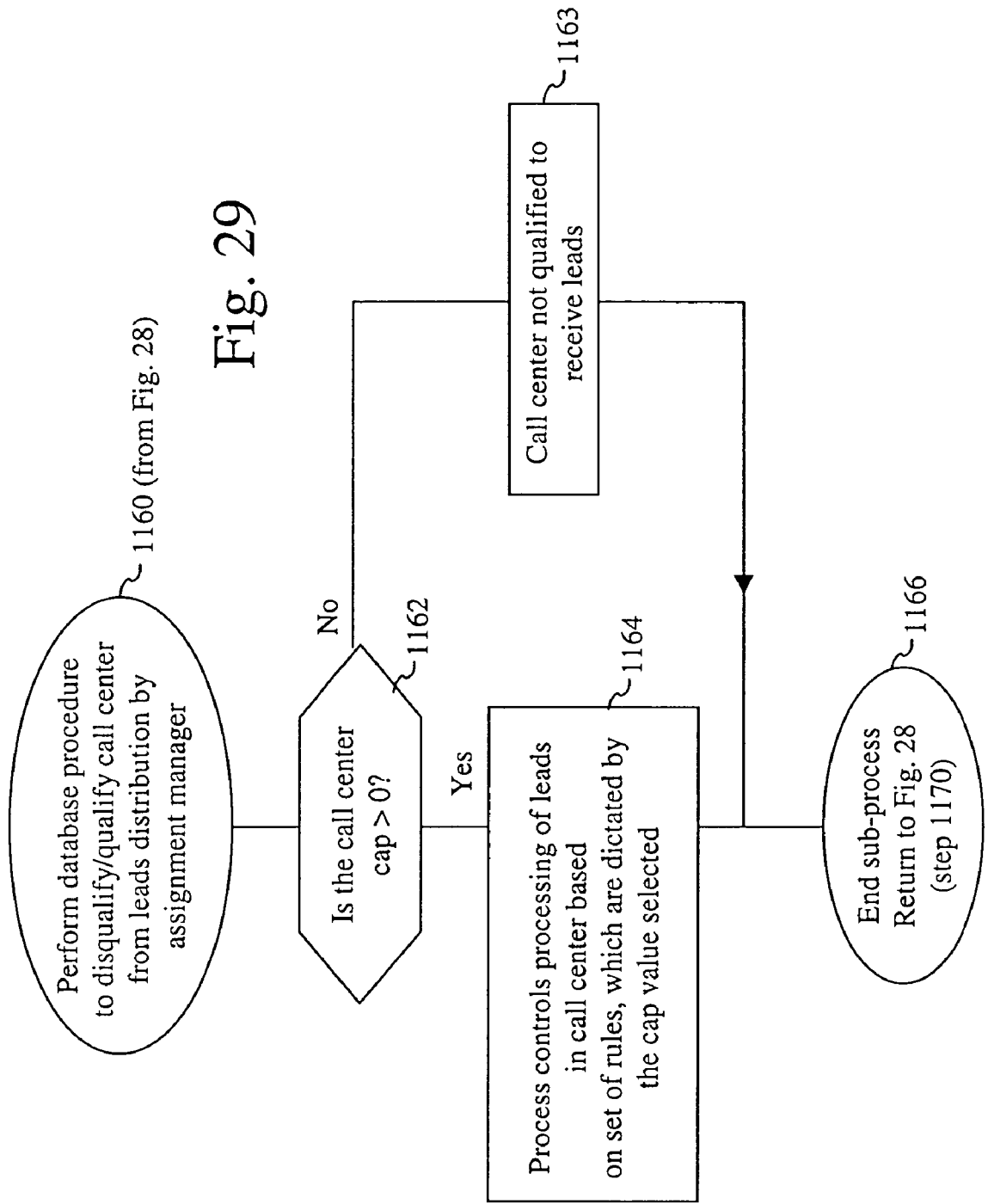

SYSTEMS AND METHODS FOR ASSIGNMENT OF SALES LEADS

CROSS REFERENCE TO PROVISIONAL APPLICATION

The subject matter of this application is related to the subject matter of provisional application U.S. Ser. No. 60/440,343 filed Jan. 16, 2003, assigned or under obligation of assignment to the same entity as this application, from which application priority is claimed for the present application. Provisional application U.S. Ser. No. 60/440,343 is incorporated herein by reference in its entirety.

CROSS REFERENCE TO RELATED APPLICATIONS

The subject matter of the present application is related to:
U.S. application Ser. No. 10/602,594;
U.S. application Ser. No. 10,602,707;
U.S. application Ser. No. 10/602,593; and
U.S. application Ser. No. 10/602,592;

each of which is filed concurrently herewith and incorporated by reference in their entirety.

BACKGROUND OF THE INVENTION

The methods and systems of the invention relate to the processing of sales leads.

In the insurance industry, as well as other industries, sales leads play an important role in the operations of a firm, company or other entity. The sales leads are obtained from any of a wide variety of sources. For example, the sales leads might come into a company from potential customers as a result of direct mailings. The number of leads that are received every day may be in the hundreds or thousands. Further, a company or other entity may utilize hundreds or thousands of agents, i.e., the persons who will ultimately work the leads with the potential customers. The agents or other persons handling the leads may be distributed over various regions and have varying expertise. These factors, as well as others, result in the assignment and distribution of leads, as well as other processing of the leads, being a complex process for large companies, as well as small companies.

Further, conventional techniques of lead assignment, lead distribution and lead maintenance often include a reasonable amount of subjectivity and manual decision-making. This subjectivity and manual decision-making can often result in inefficiencies, as well as adverse attitudes from a person or persons who might feel slighted by a particular decision, i.e., regarding the assignment of a lead, for example. Further, the subjectivity and manual decision-making also add to the time consuming nature of the assignment and distribution of leads.

Further, the current processes associated with leads distribution to agents is paper intensive. Using conventional approaches, support leaders in the regional offices, for example, print lead cards and mail these paper documents to the agents. The agents work on these leads, mark the outcome and mail the lead cards to a further location, where the outcome or disposition of the sales leads are manually entered into the system. In addition, while the agent is working the lead, there is no systemic mechanism of tracking activities on a given lead.

Further, problems relate to agent generated business, i.e., business that is generated by an agent as opposed to activities of the company. Using conventional techniques agent generated business may not be monitored until an actual sale occurs. That is, agent generated business is commonly performed without any pre-sales assignment or tracking.

Further, known systems and methods fail to allow effective maintenance of leads. For example, shortcomings of existing systems include deficiencies in tracking the history of a lead, deficiencies in tracking the pre-sales activity of a lead, and lack of control over the timely processing of the outcome of a lead.

The methods and systems of the invention address the above problems, as well as other problems and shortcomings of known techniques for processing sales leads.

BRIEF DESCRIPTION OF THE INVENTION

In accordance with one aspect, the invention provides a method of assigning sales leads in a network environment, the sales leads relating to persons interested in effecting a purchase, the method comprising: obtaining a lead, the lead including lead information relating to a person interested in effecting a purchase; loading the lead into a lead processing portion; determining if the lead is auto-assignable; assigning the lead to a sales agent; and outputting the lead information over the network environment to a lead distribution portion, so as to be accessible to the sales agent.

In accordance with a further aspect, the invention provides a computer-implemented system for assigning sales leads in a network environment, the sales leads relating to persons interested in effecting a purchase, the computer-implemented system comprising: a data entry portion through which a lead is obtained, the lead including lead information relating to a person interested in effecting a purchase; a lead processing portion into which the lead is loaded from the data entry portion, the lead processing portion determining if the lead is auto-assignable, and the lead processing portion assigning the lead to a sales agent; and the lead processing portion outputting the lead information over the network environment to a lead distribution portion, so as to be accessible to the sales agent.

Accordingly, a technical effect, utility and/or contribution for the disclosed inventive technology is to provide systems and methods for processing sales leads using a variety of techniques, as set forth below.

BRIEF DESCRIPTION OF THE DRAWINGS

The present invention can be more fully understood by reading the following detailed description together with the accompanying drawings, in which like reference indicators are used to designate like elements, and in which:

FIG. 16 is a flowchart showing different dispositions of leads in accordance with one embodiment of the invention;

FIG. 23 is a table showing various lead assignment criteria in accordance with one embodiment of the invention;

FIG. 24 is a table showing further lead assignment criteria in accordance with one embodiment of the invention;

FIG. 25 is a table showing further lead assignment criteria in accordance with one embodiment of the invention;

FIG. 29 is a flowchart showing the perform database procedure to disqualify or qualify a call center from the distribution of leads by an assignment manager in accordance with one embodiment of the invention.

DETAILED DESCRIPTION OF THE INVENTION

Figure 1:
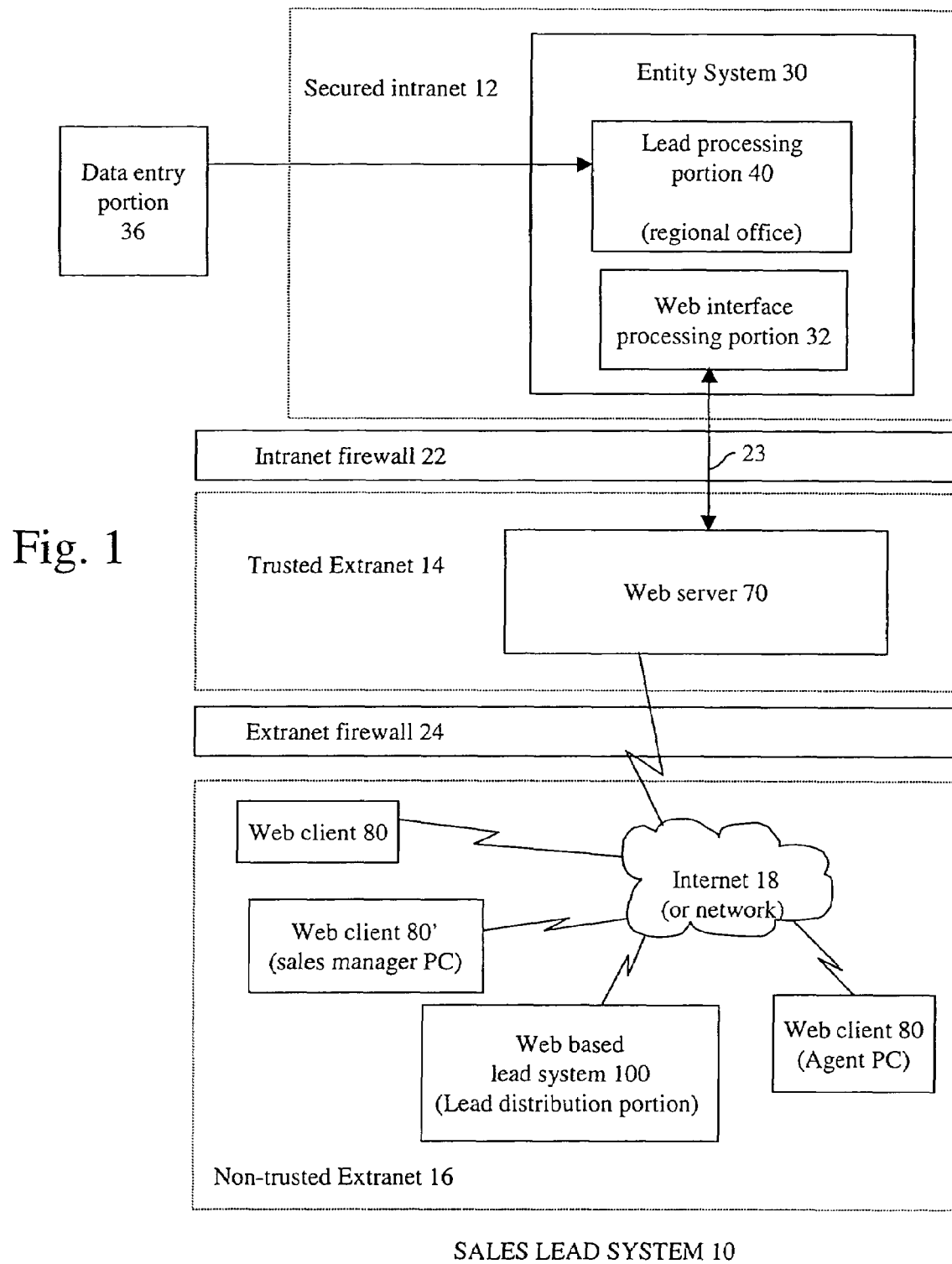
FIG. 1 is a block diagram showing a sales lead system in accordance with one embodiment of the invention.

Hereinafter, aspects of the systems and methods of the invention in accordance with the various embodiments will be described. As used herein, any term in the singular may be interpreted to be in the plural, and alternatively, any term in the plural may be interpreted to be in the singular.

The systems and methods of the invention are directed to the above stated problems, as well as other problems, that are present in conventional techniques. The foregoing description of various products, methods, or apparatus and attendant disadvantages described in the "Background of the Invention" is in no way intended to limit the scope of the invention, or to imply that the invention does not include some or all of various elements of known products, methods, and/or apparatus in one form or another. Indeed, various embodiments of the invention may be capable of overcoming some of the disadvantages noted in the "Background of the Invention," while still retaining some or all of the various elements of known products, methods, and apparatus in one form or another.

The system and method of the invention provide for the digitized and automated processing of sales leads. In accordance with aspects of the invention, a set of rules is used to provide the logic for the initial assignment of sales leads to agents. Further, automated processing is used for the distribution of the leads. In accordance with one embodiment of the invention, the method uses a calculated score for every agent to which leads might be assigned. This score may be characterized as an "Agent Performance Profile (APPS) Score. Further processing is provided by the systems and methods of the invention to monitor and control the sales lead after release to an agent. For example, the system allows for an agent to provide updates regarding the status of a lead, an agent to check on their overall leads inventory, for the effective determination that a lead is appropriately classified as agent generated business, and for the effective resurrection of a lead after the lead has been temporarily shelved, as well as a variety of other processing associated with the sales lead.

Various aspects of the systems and methods of the invention are described herein as implemented in conjunction with, or utilized by, an "agent" or a "sales agent" As used herein, an "agent" or "sales agent" may be interpreted to mean an individual who is assigned "sales leads", i.e., leads, with the objective of attaining sales based upon those sales leads including working with a person to effect a purchase. Further, the sales lead results from a person, who is interested in making the purchase, submitting information, i.e., such as a person responding to a mailing from an insurance provider, for example. The term "purchase" as used herein means the acquisition by the person of a product, a service, a lease, a rental, or any other transaction in which a person gives something anticipating something in return.

In accordance with one embodiment of the invention, a group of leads might be generated by performing a mass mailing requesting interested persons to mail in a completed form. In response, interested persons complete and mail the requested form to a designated central location, for example. Data entry persons at the designated central location then enter the data from each form into a database, i.e., so as to constitute a lead. A group of leads, once collected, may then be channeled to a regional office, for example, in a batch. The zip code associated with each lead may be used for this batch processing.

Once at the regional office, for example, an automated assignment system, as described in detail below, is used to assign and distribute the leads to the agents automatically. That is, for example, each lead categorized as an 'A' lead, i.e., a lead that has not been worked before, is scored using a set of rules and is assigned to an agent at the regional office. The assignment of the A-leads may use an agent's score. The release or distribution of the leads may be performed using what might be characterized as a web based lead system, also described in detail below. The systems and methods of the invention also provide for the processing of what is herein characterized as B-leads, i.e., leads that have been processed before, but that have been shelved for some reason. As used herein, the term "worked lead" or an agent "working a lead" or similar language means that an agent has been assigned to a sales lead, in order to try to secure a sale based on that lead, and that the agent has taken some steps to bring about such a sale, such as making calls to the person, researching the lead and/or setting up an appointment, for example.

In accordance with one embodiment of the invention, once leads are received in the regional offices, the leads are then digitally released to the agents. However, there is also provision provided for manual assignment of leads where necessary. Further, sales support leaders and regional office managers, for example, may overwrite an agent recommended by the automated processing. As noted above, the systems and methods of the invention, in accordance with one embodiment, utilizes a scoring system. The scoring system is used in the system and method of the invention to put lead resources, which may be limited, into the hands of those most likely to convert the sales leads to sales.

In accordance with one aspect of the invention, a web-based tool is used to distribute leads to the agents via the web. The web based lead system may be connected to a processing portion that handles release of the leads to the agents. In accordance with one embodiment of the invention, agents log on to the web based lead system and click on a suitable access link. Upon authorization of user and password, for example, a web window pops up with a page bearing various leads information. Functionalities of the web based lead system include accessing a variety of lead details, updating lead information, entering agent generated business, submitting sale confirmation information that might be forwarded on to a company legacy system, entering activities involved in the sale of a lead, and use of a calendar feature, for example.

FIG. 1 is a block diagram showing a sales lead system 10 in accordance with one embodiment of the system of the invention. As shown, the lead system 10 includes an entity system 30. The entity system 30 is the business entity that supports numerous agents in a particular region or territory, for example, in accordance with one embodiment of the invention. The entity system 30 might constitute a regional office, for example. As described above, a batch of new leads may be forwarded from a central data entry portion 36 to the entity system 30. The data entry portion 36 may be in a wide variety of forms, such as a large central facility or a person working from a PC at home. The new leads are forwarded to the entity system 30 for assignment and distribution of the new leads, as is discussed in detail below. For example, the new leads might be forwarded to the entity system 30 based on the zip code of the new lead. The sales leads might be obtained from a variety of sources, including mass mailings as noted above or from the agents themselves.

The agents that interact with the entity system 30 may be disposed at multiple web clients (80), in accordance with one embodiment of the invention. The entity system 30 communicates information to and from the web clients (80), via a web based lead system 100, to process sales leads that are obtained by the entity system 30. Further, agents may submit new lead information to the entity system 30 by utilizing the web clients (80). Further, as illustrated in FIG. 1, a sales management person may interact with the entity system 30 through a web client 80'.

As shown in FIG. 1, the entity system 30 includes a lead processing portion 40 and a web interface processing portion 32. The lead processing portion 40 performs a wide variety of processing relating to sales leads. Further, the web interface processing portion 32 provides various functionality relating to the communication of the entity system 30 with the web clients (80, 80'). Further details of the lead processing portion 40 and the web interface processing portion 32 will be described below.

In accordance with one embodiment of the invention, the entity system 30 is disposed in a secured intranet 12. The entity system 30, and specifically the web interface processing portion 32, is in communication with a web server 70. The web server 70 is disposed in a trusted extranet 14, as shown in FIG. 1. The secured intranet 12 and the trusted extranet 14 are separated from each other by an intranet firewall 22, in accordance with one embodiment of the invention. The entity system 30 and the web server 70 may communicate with each other using a suitable communication channel 23 or in any other suitable manner.

In turn, the web server 70 communicates with the various web clients, i.e., the agents, via the internet 18 and the web based lead system 100, which serves as a lead distribution portion. Specifically, in accordance with one embodiment of the invention, the web server 70 outputs and receives various information from a web based lead system 100. As described in detail below, the web based lead system 100 serves as a window through which a variety of information may be received from and conveyed to the lead processing portion 40 (via the web server 70), i.e., such as information that is obtained from agents. In accordance with one aspect of the invention, each of the web clients 80 may access the lead processing portion 40, via the web based lead system 100, to obtain information regarding new leads, existing leads, and various activities that the agents are engaged in, for example. Accordingly, the web based lead system 100 acts as a lead distribution portion through which agents and supervisory type persons may access a variety of information that is stored in the lead processing portion 40, or alternatively, that is accessible through the lead processing portion 40.

Accordingly, the web server 70, the web clients 80, and the web based lead system 100 are connected to each other via the internet 80, in accordance with one embodiment of the invention. The web clients 80 and the web based lead system 100 are accessed over the internet and thus are disposed in what might be characterized as a non-trusted extranet 16. The web server 70 on the trusted extranet 14 may be separated from the internet 18, using a suitable extranet firewall 24.

However, it is to be appreciated that a variety of arrangements may be used in accordance with different embodiments of the invention. For example, while the intranet firewall 22 and the extranet firewall 24 are utilized in the illustrative system of FIG. 1, it may be the particular situation that a firewall is not required. Alternatively, for example, the web based lead system 100 might be disposed on the secured intranet 12, i.e., in such a manner that the various web clients 80 could access the web based lead system 100. In such a situation, it may also not be required to utilize firewalls. Various other arrangements and communication schemes may be used as is suitable or desired.

Figure 2:
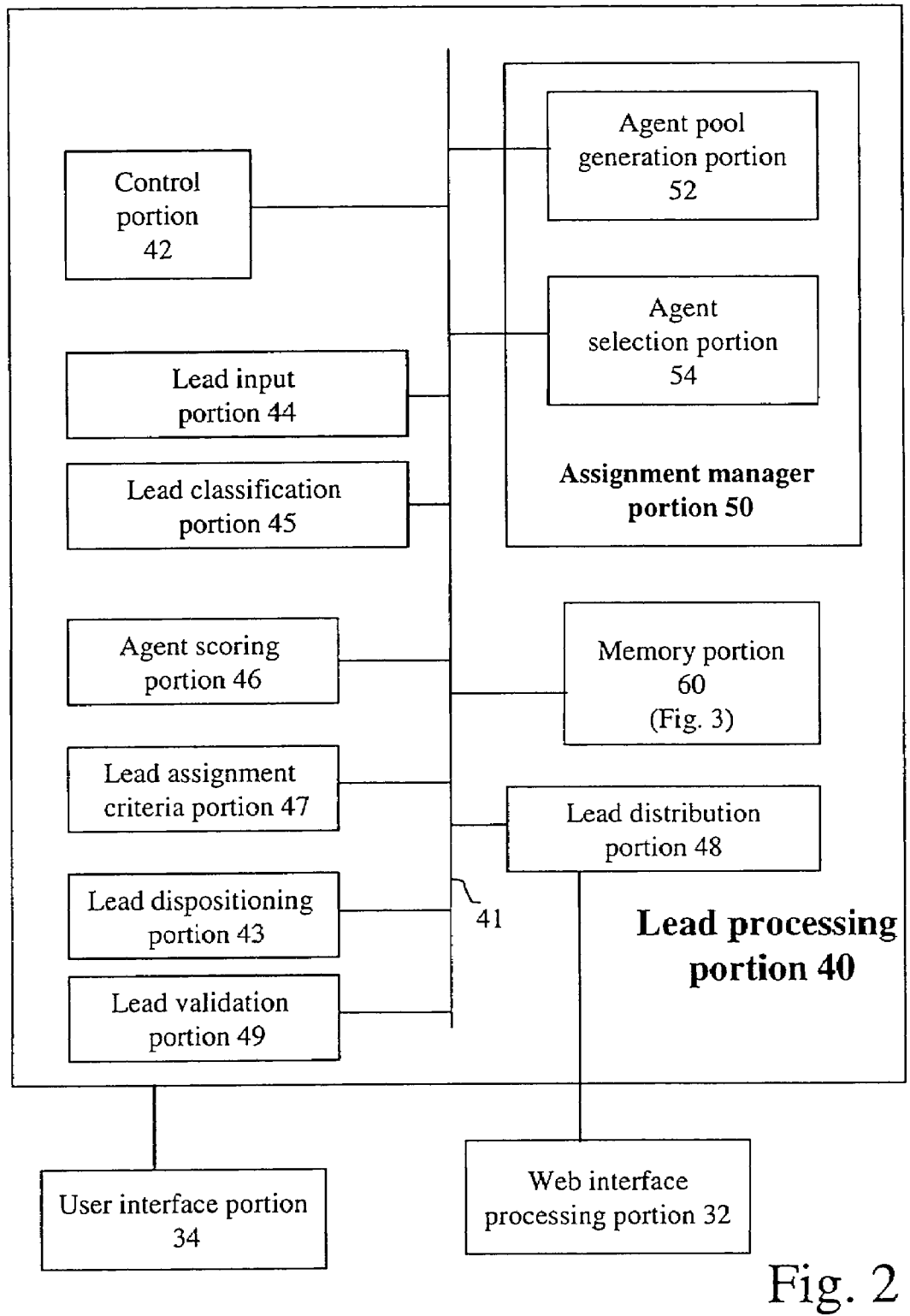
FIG. 2 is a block diagram showing the lead processing portion of FIG. 1 in further detail in accordance with one embodiment of the invention.

FIG. 2 is a block diagram showing the lead processing portion 40 of FIG. 1 in further detail, in accordance with one embodiment of the invention. As described above, the lead processing portion 40 is connected to the web interface processing portion 32. In turn, the web interface processing portion 32 is in communication with the web based lead system 100.

Also, FIG. 2 illustrates a user interface portion 34. The user interface portion 34 allows a user to interface with the lead processing portion 40. For example, such a user might be an administrator or sales management person, for example. The user interface portion 34 may take on a wide variety of forms, as desired. For example, the user interface portion 34 might be a computer disposed in the secured intranet 12 which interfaces with the human user utilizing a key pad and monitor. The user interface portion 34 may provide a sales management person with the ability to view sales agents activities in real time, i.e., as those agents enter information using the web clients 80.

As shown in FIG. 2, the lead processing portion 40 includes a control portion 42. The control portion 42 controls overall operations of the lead processing portion 40, which are not otherwise handled by the various processing portions as described below.

The lead processing portion also includes a lead dispositioning portion 43. The lead dispositioning portion 43 inputs disposition codes that are assigned to a lead or leads. Based on the disposition code, the lead dispositioning portion 43 assigns processing to be effected on such leads, as is described further below.

The lead processing portion 40 also includes a lead input portion 44, a lead classification portion 45, an agent scoring portion 46 and a lead assignment criteria portion 47. The lead input portion 44 receives data transmissions from the data entry portion 36, for example, to input a batch of new sales leads. The lead classification portion 45 performs various processing on the various leads that are received in order to appropriately classify the leads. The various portions of the lead processing portion 40 may be connected utilizing a suitable interface 41.

The lead processing portion 40 also includes the agent scoring portion 46. The agent scoring portion 46 performs various processing associated with the respective agents. That is, the agent scoring portion 46 retrieves various information regarding the agents from an agent memory portion 68, for example. The agent scoring portion 46 processes this information to generate a score for each agent. This score is then later used in the method of the invention to determine which leads should be assigned to which agents.

The lead processing portion 40 also includes the lead assignment criteria portion 47. The lead assignment criteria portion 47 contains parameters used in the processing of leads. For example, the number of leads that a particular agent might handle at one time may be stored in the lead assignment criteria portion 47, as well as other parameters. These parameters may be changed, as desired. The lead assignment criteria portion 47 might interact with a user so as to allow the user to change the lead assignment criteria in the lead assignment criteria portion 47. Further details of the lead assignment criteria portion 47 and its operations will also be described below.

The lead processing portion 40 also includes a lead distribution portion 48. The lead distribution portion 48 works in conjunction with the web interface processing portion 32 to distribute the leads to the selected agent. That is, the lead distribution portion 48 outputs information regarding the sales lead and the selected agent to the web based lead system 100. Further details of operation of the lead distribution portion 48 will be described below.

Also, the lead processing portion 40 includes a lead validation portion 49. The lead validation portion 49 performs processing of new leads to determine whether the leads are valid. In particular, the lead validation portion 49 considers whether a new lead submitted by an agent is a duplicate lead or is correctly considered "agent generated business," in accordance with one embodiment of the invention, as described below. The question of whether a lead is or is not agent generated business may typically affect the commissions that the agent receives for that particular lead.

In accordance with one embodiment of the system and method of the invention, the lead processing portion 40 also includes an assignment manager portion 50. The assignment manager portion 50 includes an agent pool generation portion 52 and an agent selection portion 54. The agent pool generation portion 52 generates a pool of agents, i.e., candidate agents, that are eligible for working on a particular marketing lead. The agent pool generation portion 52 may utilize both criteria of the lead as well as criteria of the respective agents to determine a match.

Further, the assignment manager portion 50 includes the agent selection portion 54. As described herein, the agent pool generation portion 52 forms a pool of candidate agents to process a particular marketing lead. The agent selection portion 54 performs further processing based on the processing performed by the agent pool generation portion 52. That is, the agent selection portion 54, if possible, selects a particular agent, i.e., a selected agent, from the pool of candidate agents. The selected agent is thus the agent that will work on the lead, absent manual intervention by a sales manager, for example. It might be the situation that a plurality of agents are so similarly situated that the agent selection portion 54 cannot discern between a final number of agents. As a result, it might be the situation that the agent selection portion 52 randomly selects between the final similarly situated agents.

The lead processing portion 40 also includes a memory portion 60. The memory portion 60 stores a wide variety of data and other information that is utilized by the lead processing portion 40. For example, the memory portion 60 may contain data regarding leads and data containing agents, as well as any operating programs utilized by the lead processing portion 40. The memory portion 60 may utilize suitable data bases, such as relational or flat databases, as is desired.

Figure 3:
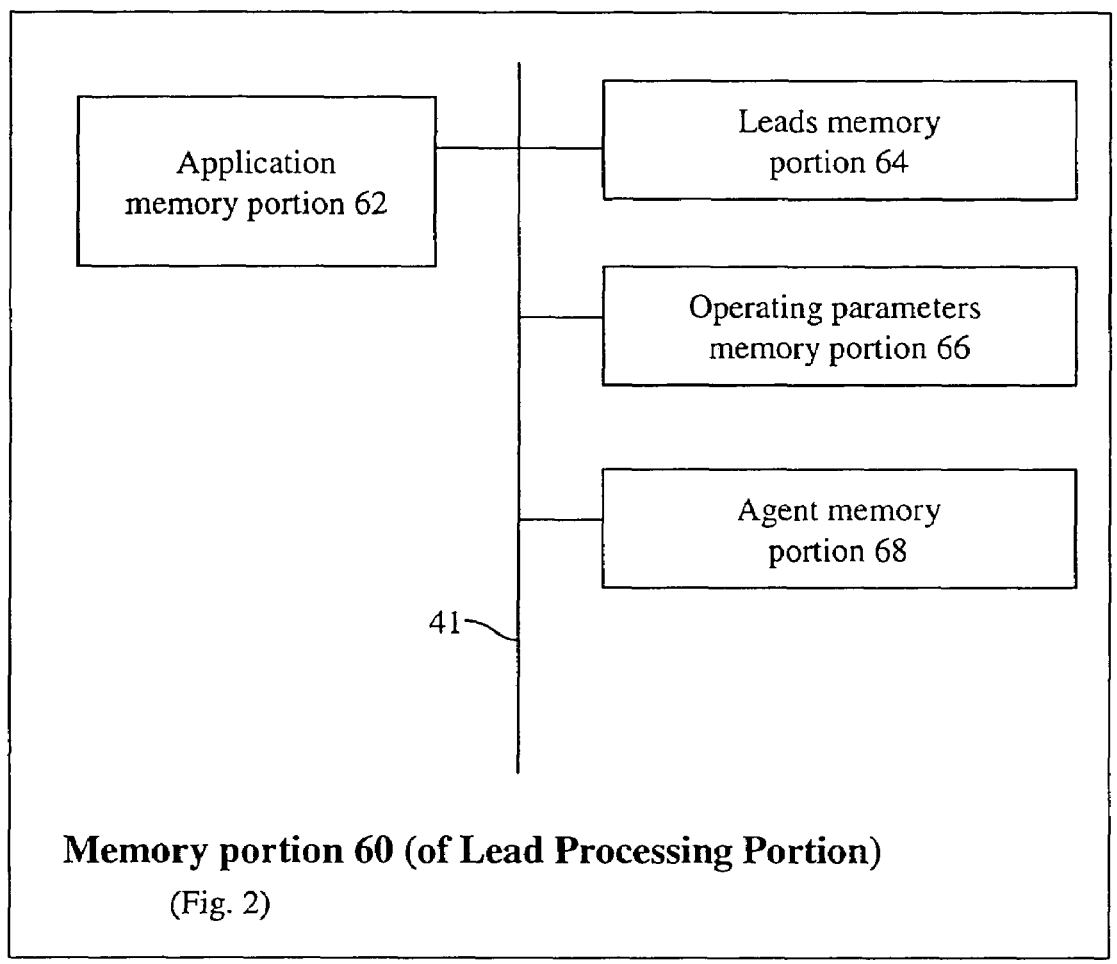
FIG. 3 is a block diagram showing the memory portion of FIG. 2 in further detail in accordance with one embodiment of the invention.

FIG. 3 is a block diagram showing in further detail the memory portion 60, in accordance with one embodiment of the invention. As shown in FIG. 3, the memory portion 60 includes an application memory portion 62, a leads memory portion 64, an operating parameters memory portion 66 and an agent memory portion 68. The various portions of the memory portion 60 may be connected utilizing a suitable interface 41, in a similar manner to the various components of the lead processing portion 40, as described above.

The application memory portion 62 contains various programs that are utilized by the lead processing portion 40. The leads memory portion 64 contains various information regarding leads. For example, the leads memory portion 64 might contain information regarding new leads. Further, the leads memory portion 64 typically contains information regarding existing leads that agents are currently working. Accordingly, for example, new leads may be compared with existing leads to determine if any of the new leads are in fact duplicates.

As shown in FIG. 3, the memory portion 60 also includes the operating parameters memory portion 66. The operating parameters memory portion 66 contains various criteria that are utilized in the processing performed by the lead processing portion 40. For example, the operating parameters memory portion 66 may contain the maximum number of leads that an agent might possess in the agent's inventory or the maximum number of leads that might be assigned to an agent in a week. Further details of various operating parameters are described below.

The memory portion 60 as shown in FIG. 3 also contains the agent memory portion 68. The agent memory portion 68 contains various information regarding agents, and in particular, the agents that are available to work a lead. The information stored in the agent memory portion 68 might include information regarding an agent's current lead inventory, information regarding past performance of an agent and/or information regarding special expertise or skills that an agent possesses, for example.

It should of course be appreciated that the agent memory portion 68 and the leads memory portion 64, for example, may collectively be accessed by a user, i.e., to use the data stored in both. For example, a user might retrieve information regarding a particular agent from the agent memory portion 68; retrieve any leads that the particular agent is handling; and thereafter retrieve more detailed information regarding those leads from the leads memory portion 64.

Figure 4:
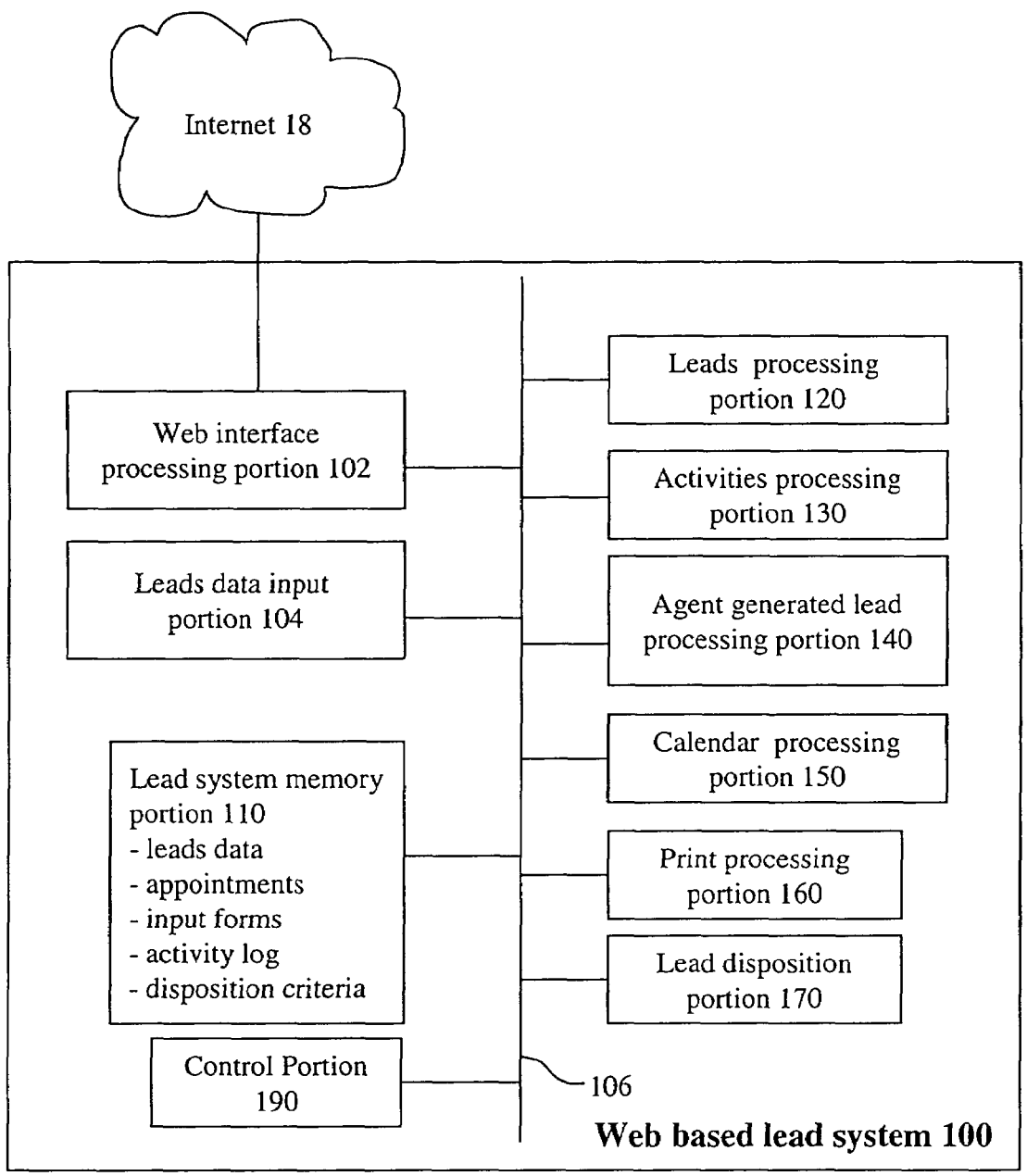
FIG. 4 is a block diagram showing the web based lead system of FIG. 1 in further detail in accordance with one embodiment of the invention.

As described above, the entity system 30 (containing the lead processing portion 40) interfaces with the web based lead system 100 across the Internet or other network. The web based lead system 100 may be characterized as a lead distribution portion. FIG. 4 is a block diagram showing further details of the web based lead system 100, in accordance with one embodiment of the invention.

The web based lead system 100 includes a web interface processing portion 102. The web interface processing portion 102 allows communication between the web based lead system 100 and the Internet 18. Also, the web based lead system 100 includes a leads data input portion 104. Once new leads are input into the web based lead system 100, utilizing the web interface processing portion 102, this information is initially processed by the leads data input portion 104 and output to an agent at the agents terminal, for example. Accordingly, the various data used and accessed by an agent or other person via the web based lead system 100 is not stored in the web based lead system 100, but rather is simply transmitted from the lead processing portion 40 to an agent, for example, through the web based lead system 100. Alternatively, the data might be transmitted to the web based lead system 100 from the lead processing portion so as to be stored, perhaps temporarily, in the web based lead system 100.

In accordance with one aspect of the invention, the leads data input portion 104 stores the new lead information in a lead system memory portion 110. The lead system memory portion 110 operates as a general purpose memory in the web based lead system 100. Accordingly, the web based lead system memory portion 110 may be utilized to store any of a wide variety of data, programs, or other information utilized by the web based lead system 100.

As shown in FIG. 4, the web based lead system 100 also includes a leads processing portion 120, an activities processing portion 130, an agent generated lead (AGL) processing portion 140, and a calendar processing portion 150. These components of the web based lead system 100 interact with, and provide information to, an agent upon that agent logging onto the web based lead system 100. Accordingly, the leads processing portion 120 interacts with the agent, as well as other users, to provide the agent various information associated with sales leads. Further, the activities processing portion 130 interfaces with an agent user to provide the user with various information regarding activities. The agent generated lead processing portion 140 interfaces with a user to provide the user with various information relating to agent generated leads, i.e., leads that the agent has generated. The calendar processing portion 150 provides the user agent with various information regarding that particular agent's calendar. Further details of each of the components of the web based lead system 100 are described below.

The web based lead system 100 also includes a print processing portion 160. The print processing portion 160 interacts with an agent, who is using the web based lead system 100, to allow the agent to print reports or updates, for example, regarding the leads that the agent is working. The completed report might then be forwarded to the agent's supervisor. The report might also be saved in the memory portion 110.

The web based lead system 100 also includes a lead disposition portion 170. The lead disposition portion 170 performs processing in conjunction with an agent's processor 80 and/or sales manager's processor to effect dispositioning of a lead, as described in detail below.

The web based lead system 100 also includes a control portion 190. The control portion 190 operates to control overall operations of the web based lead system 100 that not performed by the more specialized operating portions described herein. For example, the control portion 190 might perform a wide variety of operations such as to coordinate operations of the various components of the web based lead system 100, control load balancing of a CPU and/or perform error recovery operations.

It is appreciated that the web based lead system 100 is herein described as being accessible over the web. However, in accordance with different embodiments of the invention, the lead system 100, as described herein, might instead be accessible over some other suitable network, i.e., and not necessarily via the world wide web or the Internet.

In accordance with the various embodiments of the invention, there are a variety of criteria that are considered in processing of the leads of the invention. FIGS. 23-25 are illustrative of criteria that may be used, in accordance with one embodiment of the invention. It should of course be appreciated that other criteria may also be used in processing of the leads. The various "lead assignment criteria of FIGS. 23-25 relate to sales leads, the various agents that might handle the lead, as well as particular processing constraints that are utilized, for example. Hereinafter, the various lead assignment criteria will be described. FIGS. 23-25 show a description of the particular criteria and who or what is associated with the criteria. Further, FIG. 23 shows processing aspects of the criteria.

As shown in FIG. 23, the first criteria that may be used in the processing of a lead is "territory" or region. In accordance with one embodiment of the invention, territories are assigned to each agent. In some situations, a particular agent might be capable of handling leads in two or more territories. Further, each lead is typically associated with a territory. In this case relating to "territory" criteria, a Sales Support Leader or other sales manager might be designated for controlling and monitoring the territories that are assigned to each agent. The "territory" criteria may be stored in an appropriate field in a data set that is associated with a given agent, i.e., such as in the agent memory portion 68, for example.

A further criteria is "position" as shown in FIG. 23. Each agent or other person who might work a lead may be associated with a particular "position." For example, different positions might include a new agent, experienced agent, or a telemarketing agent. Appropriate criteria are assigned based on the position, in accordance with one embodiment of the invention. Further, separate rules might be used in the agent selection process based on the particular position, i.e., the rules may vary between positions. For example, separate rules might be used to specify the workload for telemarketing positions versus a new agent workload. Persons who might monitor and control the "position" include sales management persons and/or a teleservices manager, for example. The "Position" criteria may be stored in an appropriate field in a data set that is associated with a given agent. In order to effect a change, the sales manager, for example, simply changes the data in the field, i.e., in the data record associated with the particular agent. Further, the systems and methods of the invention may use various automated processes in conjunction with the "position." For example, the system might automatically update an agent's record to reflect the transition of a "new agent" to an "experienced agent."

A further criteria is an "endorsement" criteria. To explain, an insurance entity that processes sales leads, as described herein, may commonly have a contract or other agreement with a company. Under the agreement, the company provides its membership lists to the insurance entity. The insurance entity, in turn, effects mailings to employees of the company. Interested employees then respond to the insurance entity. Typically, the particular offer made to the employees of the company is specifically crafted for the particular company. As a result, it can be appreciated that particular expertise is helpful to an agent in processing such endorsed leads.

In accordance with one embodiment of the invention, "endorsement" criteria is associated with a particular agent to reflect a particular skill that an agent possesses. Relatedly, a particular lead will be flagged as requiring a particular endorsement. That is, the agent flag reflecting an endorsement is compared to a flag on the lead that requires an endorsement. In accordance with one embodiment of the invention, agents that do not have the required endorsement will be precluded from working that particular lead. On the other hand, an agent might not be precluded from working a particular lead, but might instead be awarded extra points for having a desired, but not required, endorsement. Persons who might monitor and control the "endorsement" criteria include various sales managers, for example. The "endorsement" criteria may be stored in an appropriate field in a data set that is associated with a given agent.

A further criteria that may be considered in processing leads is "lead credit balance" (LCB) criteria. For example, the method may require the (LCB>0), i.e., that an agent must have at least one lead credit in order to get leads in that assignment session. In accordance with one embodiment of the invention, the lead processing portion 40 of FIG. 1 automatically handles the LCB associated with each agent. The particular LCB criteria may be implemented in the assignment rules and varied as desired. Aspects of the lead credit balance are further described below.

A further "specialized" criteria relates to whether a lead is associated with a particular insurance company, in accordance with one embodiment of the invention, or if the lead is in some other way specialized. A suitable flag for each agent is created that will reflect the skill needed. This flag is then compared to an appropriate code on a particular lead to determine if an agent should be considered for working a lead. Persons who might monitor and control this "specialized" criteria include various sales managers, for example. This "specialized" criteria may be stored in an appropriate field in a data set that is associated with a given agent.

A further criteria is a "get leads" criteria. This flag must be true in order for an agent to get leads, in accordance with one embodiment of the invention. Accordingly, this flag allows an agent to be blocked from receiving further assignments. Persons who might monitor and control this "get leads" criteria include various sales managers, for example. This "get leads" criteria may be stored in an appropriate field in a data set that is associated with a given agent.

A further criteria is the "channel" criteria, as shown in FIG. 23. In this criteria, rules will be created that always route certain leads to positions associated with alternative channels. As used herein, a "channel" means a particular way of processing a lead. For example, a career agent processing a lead is one channel and using a call center is another channel. Selling a policy through a bank or a brokerage firm might be a yet further channel, for example. In accordance with one embodiment of the invention, the lead processing portion 40 automatically handles processing associated with the "channel" criteria. That is, special rules may be set up to route leads to a particular channel.

With further reference to FIG. 23, a further criteria is a "lock assignment" criteria. This flag must for set for "false" in order for a lead to be part of the assignment process. Persons who might monitor and control this "lock assignment" criteria include various sales managers, for example. Further, the criteria might be automatically controlled by the lead processing portion 40, for example.

FIG. 24 shows further criteria in accordance with one embodiment of the invention, including "resurrection date" criteria. This criteria relates to a situation where a lead has been worked by an agent, but work is delayed for a period of time. At the time the decision is made to delay work on the lead, a resurrection date may be assigned. This is the date that the lead will again be picked up by an agent to be worked. Accordingly, a lead must have a resurrection date equal to or earlier than the current date in order to be assigned to an agent. This criteria is typically automated and set based on the disposition of a particular lead.

A further criteria is "Release Flag" criteria, in accordance with one embodiment of the invention. This flag must be set in order for an agent to see a lead. This is the situation where a lead has been assigned to an agent, but for one reason or another, the lead is not yet ready to be worked. In accordance with one embodiment of the invention, leads which are not released, i.e., that do not have the "release" flag set, are not assigned through the assignment manager 50, but rather are held in a queue in the lead processing portion 40. This flag may be controlled by an sales manager and/or automated in some fashion.

Another criteria that is used in the processing of leads is the "agent profile score." The agent profile score may be based on a variety of criteria, as desired. In accordance with one embodiment of the invention, the agent profile score is updated weekly so as to prioritize agents for the assignment of leads. This updating of the agent profile score may be done automatically.

Another criteria is the "A-lead conversion" criteria. This criteria is handled automatically by the lead processing portion 40, in accordance with one embodiment of the invention. The A-lead conversion criteria is a metric of how many A-leads are required for an agent to achieve a sale. For example, the metric might be the ratio, over some time period, between the average number of A-leads in the agent's inventory and sales of the agent.

A further criteria is the "appointments seen" criteria. This criteria relates to the value, which is associated to an agent, of how many appointments were seen in a given week, for example. As an agent has more appointments the "appointments seen" value is increased for that particular agent. This criteria is automated, in accordance with one embodiment of the invention.

A further criteria is the "A-Lead Inventory." This is a parameter, associated with an agent, that keeps track of how many A-leads" an agent has in her inventory. This criteria may be automated and updated weekly, for example, in accordance with one embodiment of the invention. To explain further, leads are characterized as an A-lead or a B-lead, in accordance with one embodiment of the invention, as described below. It should further be appreciated that the number of B-leads in an agent's inventory may also be a criteria upon which lead assignment is based.

As noted above, a further criteria is "lead credit balance (LCB)." In accordance with one embodiment of the invention, a "lead credit" of a particular value is assigned when an agent converts a lead to sales. Further, when an agent is assigned a new lead, a lead credit is taken away from the agent, for example. In this manner, the total inventory of the agent may be further monitored and controlled. The LCB might be characterized as a running balance of leads that the agent has in their inventory. Further, the LCB reflects a level of efficiency of the agent. An amount that a particular lead, which is sold, may vary based on a particular premium that is associated with that lead. Accordingly, one lead may well be worth more to the agent than another lead, i.e., in terms of the agent's lead credit balance. The lead credit balance may be automatically adjusted by the lead processing portion 40, for example.

A further criteria is the percent of agent generated leads (AGL). This criteria monitors how much business the particular agent has submitted. This criteria may be automated and controlled by the lead processing portion 40, in accordance with one embodiment of the invention.

With reference now to FIG. 25, a further criteria is the "default rule" criteria. This criteria relates to the situation where no agent in a particular region, for example, qualifies for a particular lead. That is, there needs to be a position in each region to which leads are assigned if no one else qualifies for the lead. The lead processing portion 40 may automatically implement this default rule, in accordance with one embodiment of the invention.

A further criteria is an "A-lead" cap. This criteria designates the maximum number of A-leads that may be assigned to a particular agent. This criteria may be implemented by the lead processing portion 40. For example, this rule might designate that an agent may have no more than 250 A-leads. As should be appreciated, it is desirable that this criteria be easily changed. In a similar manner, a further criteria is the number of "B-leads" that is assigned to a particular agent.

A last criteria, as shown in FIG. 25, is an "A-Leads Weekly" criteria, in accordance with one embodiment of the invention. This criteria designates the number of A-leads that are assigned to an agent in a week. For example, a rule may be used by the lead processing portion 40 that allows an agent to have no more than 20 A-leads assigned in the current week.

It should of course be appreciated that other criteria, in addition to those criteria discussed above, may be used as is desired or necessary. Hereinafter, further aspects in accordance with embodiments of the invention, and implementation of the criteria, will be described with reference to FIG. 5.

Figure 5:
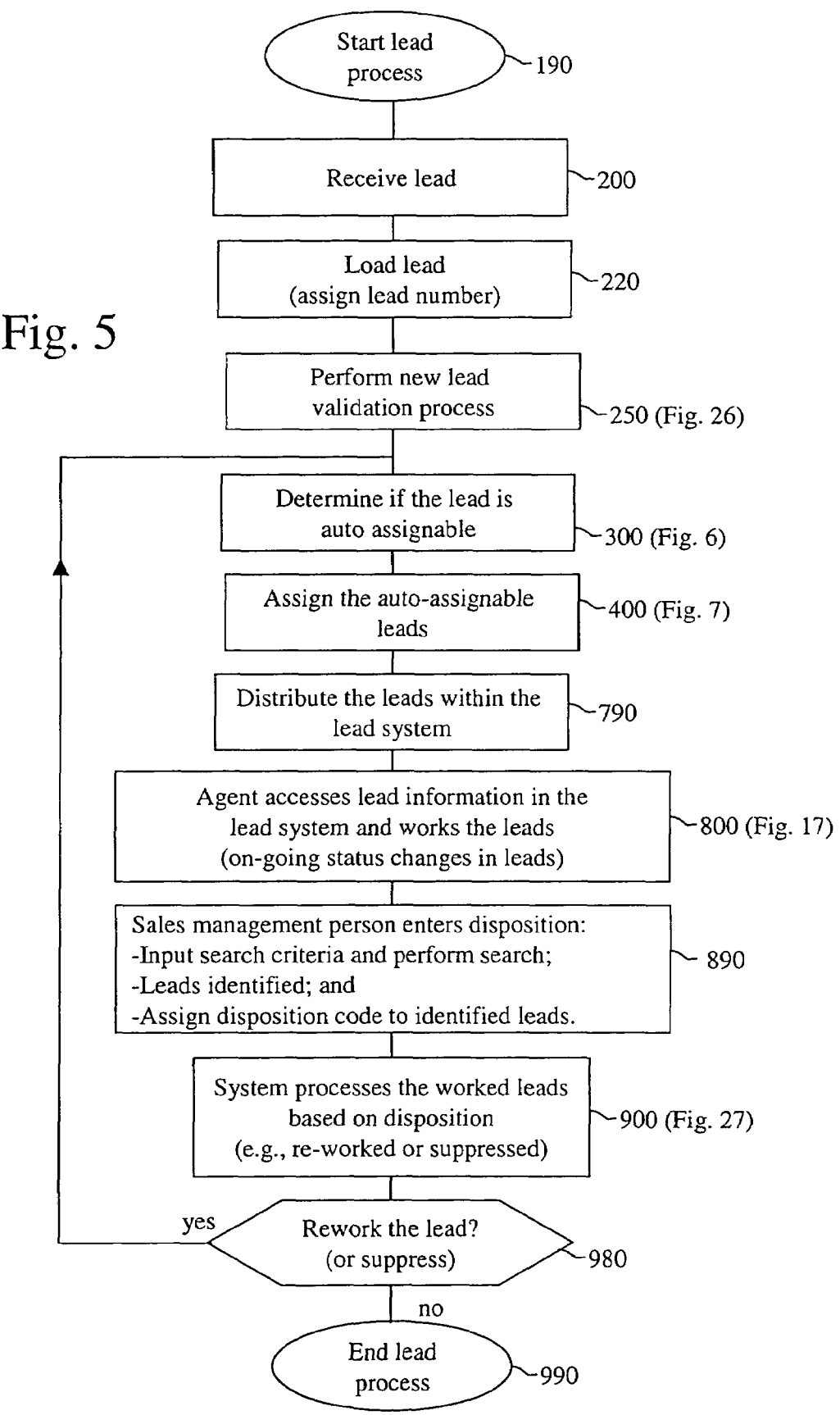
FIG. 5 is a flow chart showing a lead process in accordance with one embodiment of the method of the invention.

FIG. 5 is a high level flow chart showing the lead process in accordance with one embodiment of the invention. It should be appreciated that the lead process as shown in FIG. 5 may be performed by the operating system shown in FIGS. 1-4 and described above. Alternatively, the process as shown in FIG. 5 might be performed by another suitable operating system.

As shown in FIG. 5, the lead process in accordance with one embodiment of the invention starts in step 190. Then, the process passes to step 200. In step 200, a lead is received by the lead processing portion 40, which may be disposed in a particular regional office, for example. The lead may be received from a variety of sources such as a central data entry portion, as described above. Further, the lead might typically be batched with other leads. Also, the lead might be received from an agent, i.e., so as to constitute an agent generated. Alternatively, the lead might be a B-lead that has been resurrected, i.e., a lead that has been worked before. After step 200 of FIG. 5, the process passes to step 220. In step 220, the lead is loaded. That is, the lead is loaded into a suitable memory, such as the leads memory 64, or in some other manner retained in the lead processing portion 40. The lead may be assigned a lead identifier number in conjunction with loading the lead, which is further described below.

After step 220 of FIG. 5, the process passes to step 250. In step 250, an initial validation process is performed on the new lead. In particular, the validation process of step 250 is directed to a lead that has been initiated by an agent, i.e., so as to constitute agent generated business. It is particularly important to determine whether such a lead is a valid non-duplicative lead due to agent commissions. That is, an agent may well obtain a higher commission for business that the agent herself generates, as opposed to sales from leads that the company generates. In accordance with one embodiment of the invention, the new lead validation portion may be performed by the new lead validation portion 49, as shown in FIG. 2.

After step 250, the process passes to step 300. In step 300, the process determines if the particular lead is an auto-assignable lead. That is, the process determines whether the lead is capable of being assigned automatically. Further details of step 300 are described below in FIG. 6. After step 300, the process passes to step 400. In step 400, assuming that the lead is auto-assignable, the process assigns the auto-assignable lead to a particular agent. Further details of step 400 are described below with reference to FIG. 7.

After step 400, the process passes to step 790. In step 790, the lead is distributed. That is, for example, the lead is output from the lead processing portion 40 to the web based lead system 100, as shown in FIG. 1. Once the lead is communicated to and disposed in (or available through) the web based lead system 100, the designated agent may access the lead utilizing a web client 80. That is, after step 790, the process passes to step 800. It is noted that the various lead information may be typically transmitted to the lead processing portion so that the various lead information may be viewed by an agent or other person, but that the lead information may typically not be stored in the web based lead system. Accordingly, the web based lead system simply acts as a conduit between the agent and the lead processing portion 40, in accordance with one embodiment of the invention. In other embodiments, the lead information might indeed be stored in the web based lead system.

In step 800, the agent accesses information regarding the new lead, as well as a variety of other information. Also, in step 800, the agent works the lead. As the agent works the lead, the agent provides updates to the system regarding the status of the lead. The updates may then be used for further automatic processing by the sales lead system 10 and/or viewed by a supervisor or manager, for example.

After step 800, the process passes to step 890. In step 890, the process allows for a sales management person to enter or effect the entry of disposition information. For example, the sales management person working at a sales management processor 80' may enter search criteria to perform a search of particular leads. For example, the search might be for endorsed leads that have not been worked in the past 45 days. Upon receiving the results of the search, the sales management person might assign a disposition code to all the leads that were identified in the search. In accordance with one embodiment of the invention, the disposition code is then sent back to the lead dispositioning portion 48 in the lead processing portion 40 for processing. That is, based on the dispositioning code, the lead is subject to particular processing, as described below. It is appreciated that the sales management person might not herself effect the search for particular leads and the assignment of the disposition to the lead, i.e., the sales management person might effect such processing by working with other technical persons, for example.

After step 890, the process passes to step 900. In step 900, the method of the invention processes worked leads based on the disposition of the worked leads. That is, when the lead is dispositioned, the lead is either suppressed or the lead is reworked, in accordance with one embodiment of the invention. As reflected in step 980 of FIG. 5, if the lead is to be reworked, the process passes back to step 300. Alternatively, if the lead is suppressed, then, in step 990, the process ends, i.e., the process ends for that particular lead. The processing of a lead might be terminated as a result of the lead resulting in a sale, or a refusal of sale by a potential customer, for example.

With reference to step 250 of FIG. 5, it should be appreciated that a variety of steps may be performed on a lead to verify that the lead is indeed a valid lead. In particular, this validation may occur in the situation where an agent herself has submitted the lead for processing. For purposes of further description of the invention with reference to FIGS. 6-25 below, it is assumed that the particular lead is indeed a valid lead. However, further details of the process of step 250, including the situation where a lead is not a valid lead, will be described below with reference to FIG. 26, in accordance with one embodiment of the invention.

Figure 6:
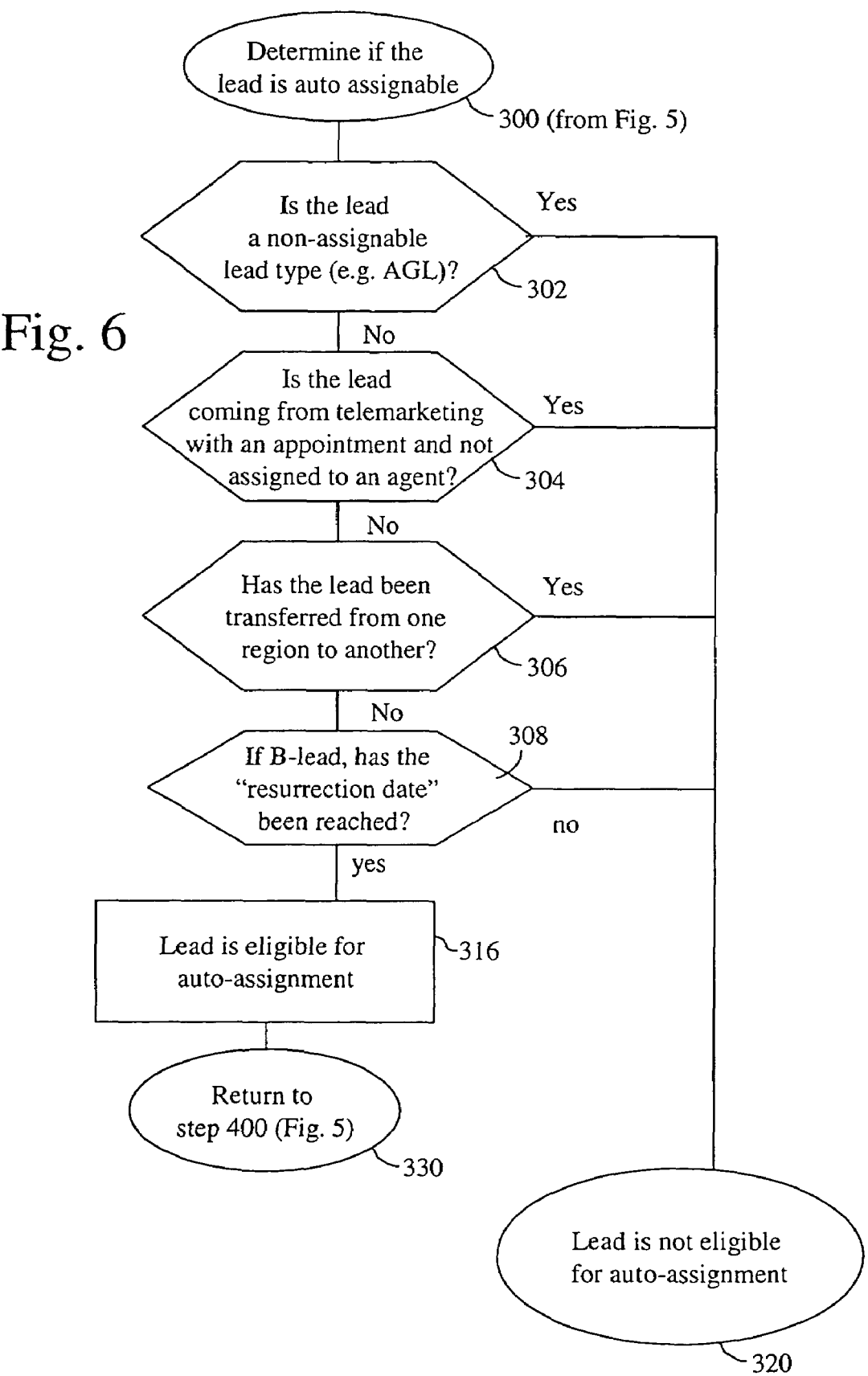
FIG. 6 is a flow chart showing the "determine if the lead is auto-assignable" step of FIG. 5 in further detail in accordance with one embodiment of the invention.

FIG. 6 is a flow chart showing in further detail the "determine if the lead is auto-assignable" step 300 of FIG. 5. As shown in FIG. 6, the subprocess starts in step 300 and passes to step 302. In step 302, a determination is made whether the lead is a non-assignable lead type. That is, some types of leads may be of a nature so that the sales entity processing the leads does not want to auto-assign such leads. An example of a non-assignable type is an agent generated lead (AGL) or agent generated business (AGB), i.e., since the agent who generated the lead will typically work that particular lead. If the lead is indeed a non-assignable lead type in step 302, the process passes to step 320. In step 320, the auto-assignment process ends for that particular lead, i.e., since the lead is not eligible for auto-assignment.

However, if the lead is not a non-assignable lead type, i.e., no in step 302, the process passes from step 302 to step 304. In step 304, the process determines whether the lead is coming from telemarketing with an appointment and not assigned to an agent. That is, this is one example of a special situation. If no in step 304, then the lead is still a candidate for auto-assignment. That is, the process passes from step 304 to step 306. Alternatively, if yes in step 304, the process passes to step 320.

In step 306, the process determines whether the lead has been transferred from one region to another. That is, the illustrative step 306 shows a further type of lead situation that might be problematic so as to not automatically assign the lead. If no in step 306, then the lead is still a candidate for auto-assignment. That is, the process passes from step 306 to step 308. Alternatively, if yes in step 306, the process again passes to step 320.

In step 308, the process determines whether the "resurrection date" has been reached, i.e., the date that the lead will again be taken up to be worked. That is, step 308 of FIG. 6 addresses an aspect of processing B-leads, i.e., leads that have been previously worked. If yes in step 308, the process passes from step 308 to step 316. Alternatively, if no in step 308, the process again passes to step 320, i.e., the lead is not yet ready to be reworked and thus is not eligible for auto-assignment.

Relating to resurrection of a lead, it is further noted, in accordance with one embodiment of the invention, that the process might not take into account the particular agent who previously worked a particular lead. That is, the agent who worked a particular lead previously would not receive any deference over any other agent in the auto-assignment process for that particular lead.

Returning to FIG. 6, in step 316, the process deems that the lead is indeed eligible for auto-assignment. As a result, the process might tag that particular lead as auto-assignable or provide another indicia or data, which is associated with the lead, to tag the lead as auto assignable. This might be the case if a batch processing approach is used. However, in accordance with one embodiment of the invention, in step 316, a lead is deemed eligible for auto-assignment and then processed immediately. Accordingly, the lead is not tagged or coded, but merely immediately forwarded for auto-assignment.

It should be appreciated that a lead may be not be automatically assignable due to a variety of circumstances. Illustratively, step 304 shows a special situation in which a lead comes from telemarketing with an appointment and without being assigned to an agent. This is one situation in which the lead processing portion 40 determines that attributes associated with the lead are problematic. As a result of a yes determination in step 304, the process passes from step 304 to step 320.

Further, the problematic situation noted above may indeed be present in step 306, i.e., the lead may have indeed been transferred from one region to another. This is another situation where the lead will not be automatically assigned. If yes in step 306, the process passes from step 306 to step 320.

Further, it might be the case in step 308 that the "resurrection date" for the lead, i.e., a B-lead has not yet been reached. Accordingly, if no in step 308, the lead will not be designated as auto-assignable. That is, the process passes from step 308 to step 320. As noted above, the process ends in step 320 for that particular lead.

Figure 7:
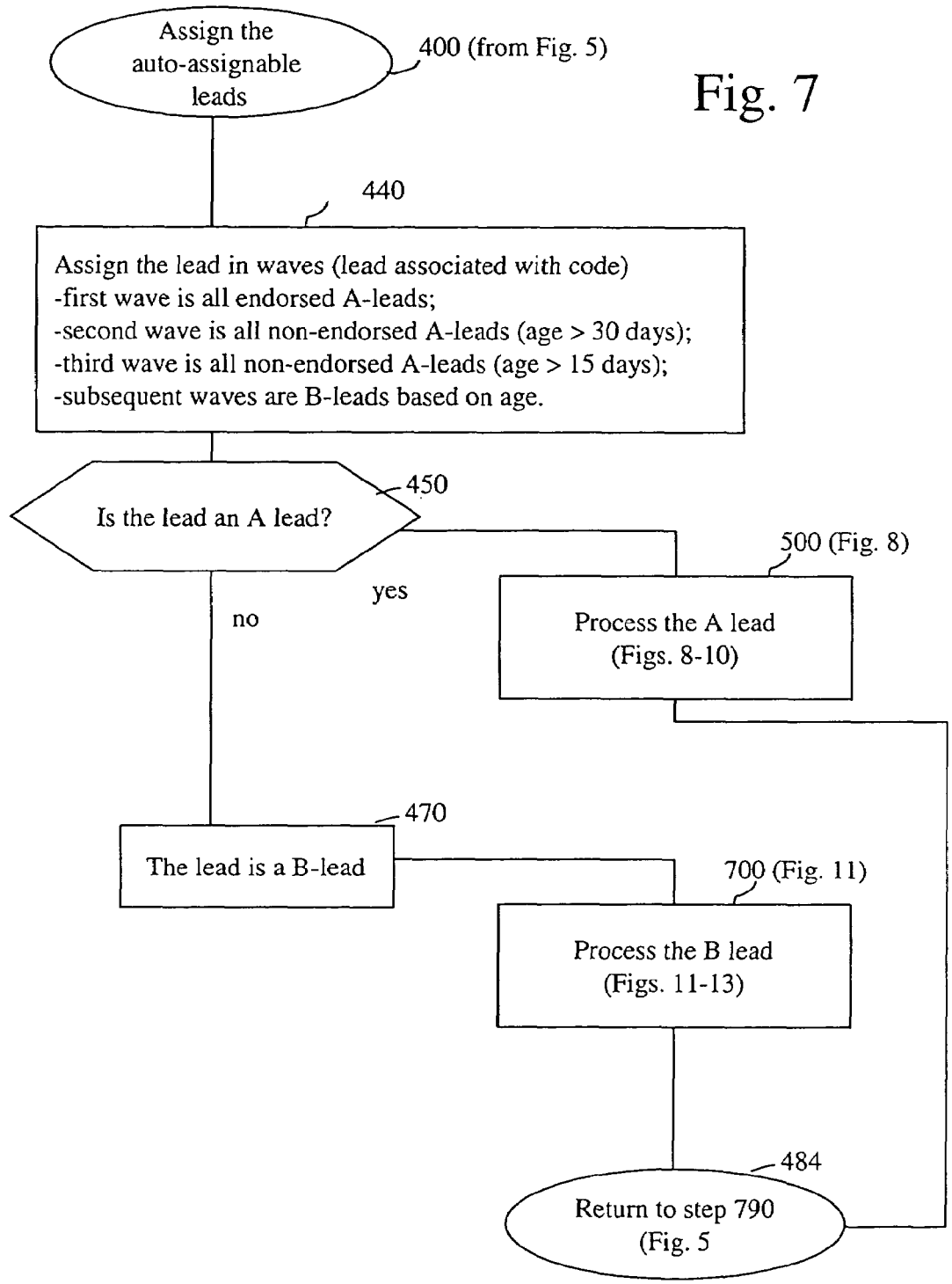
FIG. 7 is a flow chart showing the "assign the auto-assignable leads" step of FIG. 5 in further detail in accordance with one embodiment of the invention.

FIG. 7 is a flow chart showing in further detail the "assign the auto-assignable leads" step 400 of FIG. 5. As shown in FIG. 7, the process starts in step 400 and passes to step 440.

Step 440 illustrates that the leads may be assigned in waves. For example, a code may be associated with a lead to determine which wave that the particular lead might belong. A first wave of leads may include all leads that are A-leads that are endorsed. Further, a second wave might include all non-endorsed A-leads that are greater than 30 days old. Further, a third wave might include all non-endorsed A-leads that are greater than 15 days old. Subsequent waves may include B-leads, that are similarly assigned in waves based on the age of the B-lead. Leads may be assigned in waves both for leads that are being assigned to an agent, as well as leads that are being assigned to a call center, as is described further below.

After step 440, the process passes to step 450 for the particular leads that are in the current wave being processed.

The process of FIG. 7 will pass to step 450 at some later time for leads that are in subsequent waves.

In step 450, the process determines whether the lead is an A-lead, in accordance with one illustrative embodiment of the invention. That is, step 450 is illustrative that different types of processing are effected upon different types of leads, i.e., leads that have been classified differently. If yes in step 450, then the process passes to step 500. In step 500, the A-lead is processed so as to assign the A-lead to an agent. After step 500, the process passes to step 484, as shown in FIG. 7. In step 484, the process returns to step 800 as shown in FIG. 5.

Alternatively, in step 450, the process may determine that the lead is not an A-lead. As a result, the process passes from step 450 to step 470. In step 470, the process determines whether the lead is a B-lead. If yes, then the process passes from step 470 to step 700. In step 700, the B-lead is processed so as to assign the B-lead to an agent. After step 700, the process passes to step 484 and processing is continued as described above.

In accordance with one embodiment of the invention, there are only A-leads and B-leads. Accordingly, the process of FIG. 7 only handles the processing of such leads. However, it should also be appreciated that other categories of leads or sub-categories of leads, for example, may be processed in accordance with different embodiments of the invention. That is, it should be appreciated that FIG. 7 illustrates the processing of exemplary A-leads and B-leads. It is appreciated that leads having designations different than those described above might also be processed utilizing similar steps to those described with reference to FIG. 7.

Figure 8:
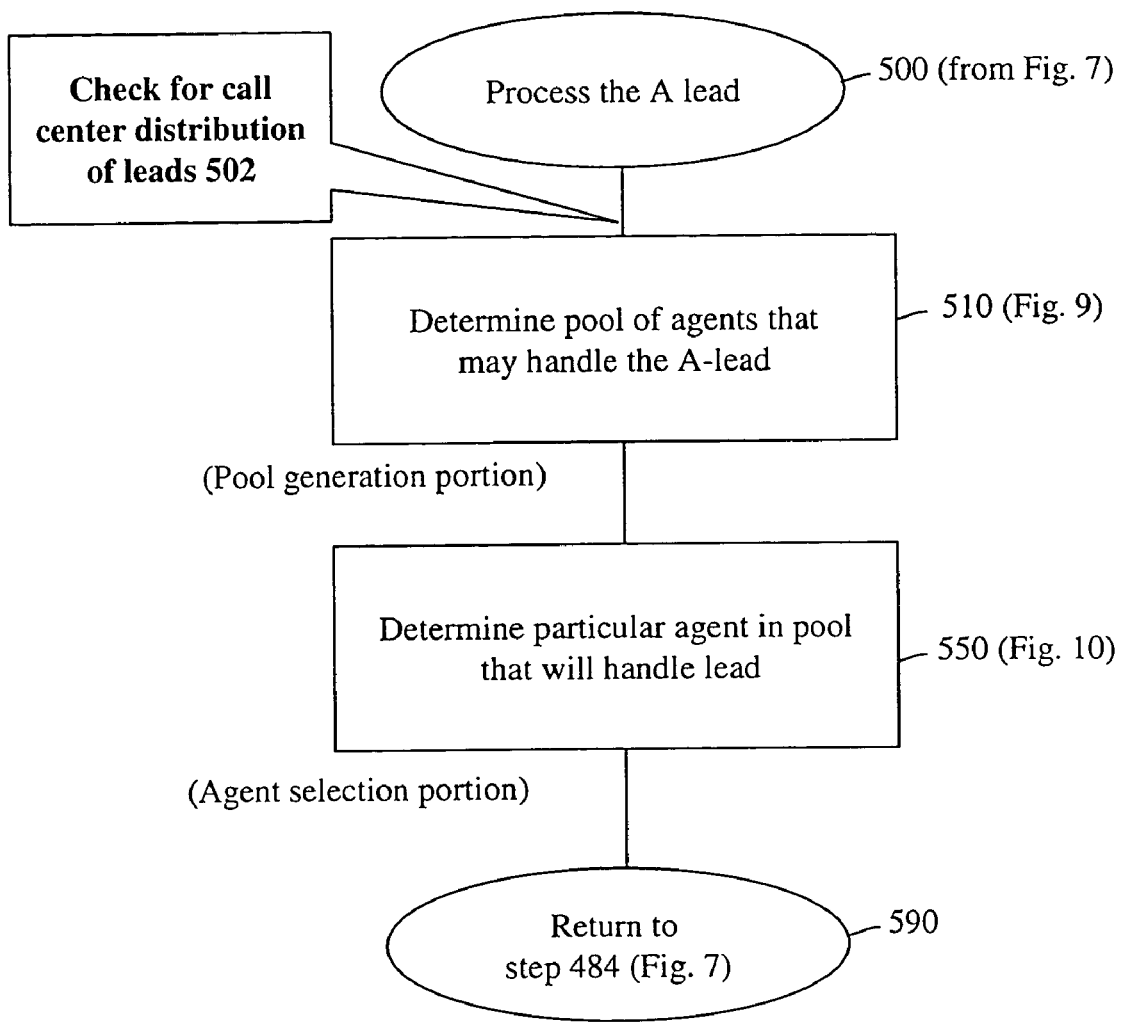
FIG. 8 is a flow chart showing the "process the A-lead" step of FIG. 7 in further detail in accordance with one embodiment of the invention.

FIG. 8 is a flow chart showing processing of an A-lead step 500 of FIG. 7 in further detail. As shown in FIG. 8, the process starts in step 500 and passes to step 510. In step 510, the process determines a pool of agents that may handle a particular lead. Then, the process passes to step 550. In step 550, the process of FIG. 8 proceeds based on the processing performed in step 510. That is, in step 550, the process determines the particular agent in the pool that will handle the lead. In other words, step 510 determines a pool of candidate agents that might work the lead. In turn, the process of step 550 determines a particular agent in that pool that will indeed work the lead. After step 550, the process passes to step 590. In step 590, the process returns to step 484 as shown in FIG. 7.

FIG. 8 also shows that the processing of the A-leads might involve forwarding the A-lead or A-leads to a call center. That is, in step 502, the process deems that a particular lead has been tagged for processing by a call center and removes that lead from the further processing of FIG. 8. The lead tagged for the call center is further processed to distribute the lead to a call center, as is described below.

Figure 9:
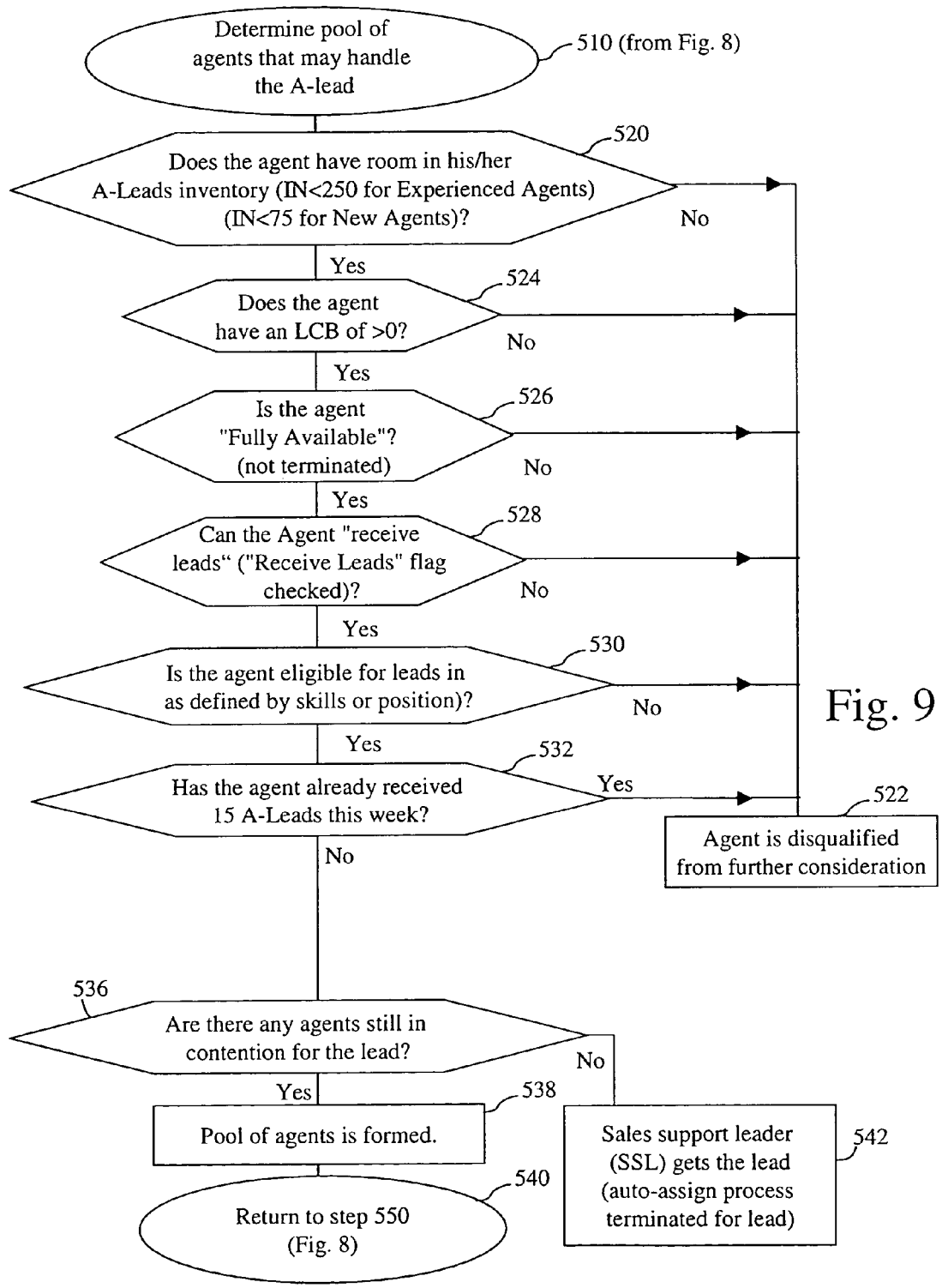
FIG. 9 is a flow chart showing the "determine pool of agents that may handle the A-lead" step of FIG. 8 in further detail in accordance with one embodiment of the invention.

FIG. 9 is a flow chart showing in further detail the "determine pool of agents that may handle lead" step 510 of FIG. 8. As shown in FIG. 9, the process starts in step 510 and passes to step 520. In step 520, the process makes a determination of whether the agent has room in his or her A-leads inventory. In accordance with one illustrative embodiment of the invention, the inventory number (IN) cannot be higher than 250 for experienced agents. The number of leads in the A-leads inventory for a new agent might be limited to less than 75. However, it should of course be appreciated that these cap levels of FIG. 520, as well as other threshold levels described herein, may be varied as desired, and are provided herein for illustrative purposes.

It may be determined in step 520, that a particular agent being processed does indeed have room in that agent's A-leads inventory. As a result, the process passes from step 520 to step 524. In step 524, a determination is made whether the agent has a Lead Credit Balance (LCB) greater than zero. If yes, then the particular agent being processed is still a candidate for working the particular lead, and the process passes from step 524 to step 526. In step 526, a determination is made whether the agent is "fully available." This step might check whether the agent was terminated or is otherwise unavailable to work a particular lead. If yes in step 526, then the process passes to step 528. Step 528 reflects a feature of the invention that the agent is associated with a "receive leads" flag. If this flag is checked, then the agent can indeed receive leads. Alternatively, if the flag is not checked for some reason, then the agent cannot receive leads.

Accordingly, if the process is yes in step 528, then the process passes to step 530. In step 530, a determination is made whether the agent is eligible for the particular lead based on the skills that are required or desired, or a particular position that is required or desired. For example, the skills that might be considered in this assessment relates to the territory's particular requirements and/or whether the agent is eligible to work a particular lead in view of the lead's endorsement status. That is, the process of FIG. 9 might further check that an agent is indeed qualified to work such an endorsed lead.

If yes in step 530, then the agent is still in the running for the particular lead, and the process passes from step 530 to step 532. In step 532, the process determines whether the agent has already received 15 A-leads this week. Accordingly, step 532 reflects a further ability by the system of the invention to monitor and control the distribution and working of leads. If no in step 532, then the process passes to step 536.

In step 536, the process makes a determination, after the various processing discussed above, whether there are indeed any agents still left in contention for the lead. That is, it might be that no agents remain as possible candidates through the processing of steps 520-534. However, if there are indeed agents still in contention for the lead, i.e., yes in step 536, then the process passes to step 538. In step 538, the pool of agents is formed. Then, the process passes to step 540. In step 540, the process returns to step 550 of FIG. 8.

It should be appreciated that the process may have determined in any of steps 520-532 that a particular agent did not satisfy the particular criteria set forth by a process step. For example, in step 524, the process may have determined that the agent did not have an LCB of greater than zero. In step 526, the process may have determined that the agent was not fully available. Further, in step 528, the process may have determined that the agent "received leads" flag was not checked. The process may have also determined that the criteria of steps 530 and/or 532 were not satisfied. As a result, the process passes from any of steps 520-532 to step 522. In step 522, that particular agent is disqualified from further consideration. However, of course, if one agent is disqualified at any point in the process, the process will continue with the agents that are not yet disqualified.

As described above, it may be the situation in step 536, that there are not any agents still in contention for the lead. As a result, the process passes from step 536 to step 542. In step 542, the Sales Support Leader (SSL) gets the lead in accordance with one embodiment of the invention. That is, the auto-assign lead process is terminated for that particular lead. The sales support leader might take and work the lead himself or herself, for example. Alternatively, the sales support leader might override any of the criteria noted above and assign the lead to an agent that the sales support leader deems suitable. That is, the sales support leader might assign the lead to an agent that the auto-assign process had previously disqualified. Note that the sales support leader, for example, might be assigned to all territories he or she oversees, i.e., such that she will be the default if all other agents are disqualified, In the process of FIG. 9, the end result in step 538 is the generation of a pool of agents, i.e., the generation of a pool of "candidate agents." After step 538, the process passes to step 540. In step 540, the process returns to step 550, as shown in FIG. 8.

Figure 10:
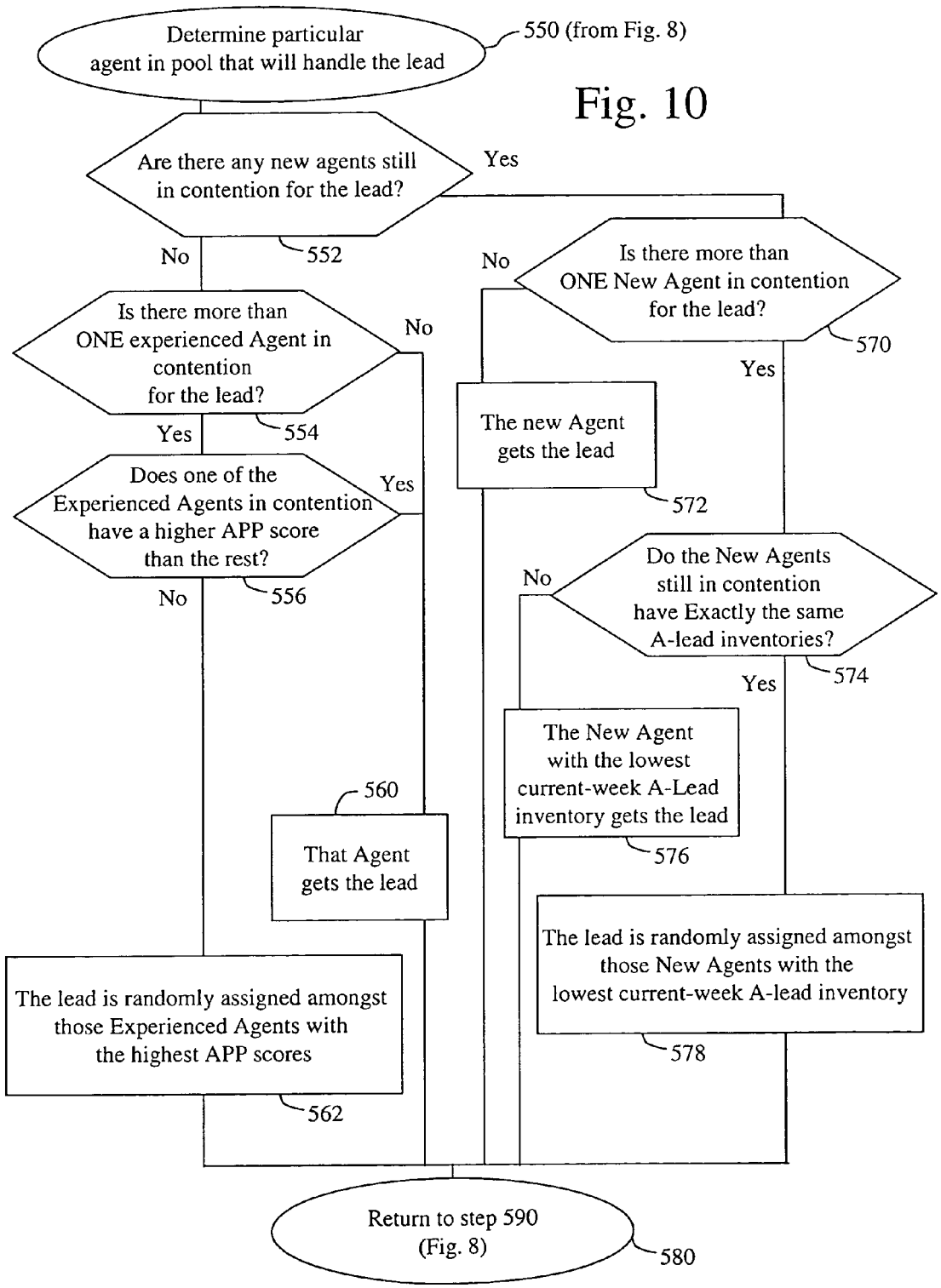
FIG. 10 is a flow chart showing the "determine particular agent in pool that will handle the A-lead" step of FIG. 8 in further detail in accordance with one embodiment of the invention.

As noted above, in step 550 of FIG. 8, the process determines the particular agent in a pool that will handle the lead. FIG. 10 is a flow chart showing in further detail the "determine particular agent in pool that will handle lead" step of FIG. 8. As shown in FIG. 10, the process starts in step 550 and passes to step 552. In step 552, the process determines whether there are any new agents still in contention for the lead. That is, the processing takes into account whether a particular candidate agent is an experienced agent or a new agent. This threshold between an experienced agent and a new agent may be determined as desired. If yes in step 552, then the process passes to step 570.

To explain further, the process of FIG. 10 favors one category of agent over another category of agent, i.e., a new agent over an experienced agent. However, it is appreciated that in a different embodiment of the invention, they may be no distinction between new agents and old agents and/or there may be a distinction based on a different grouping of agents, as is desired.

Returning to FIG. 10, in step 570, the process determines whether there is more than one (1) new agent in contention for the lead. It may be that there is only one new agent left. If there is only one new agent left, the process passes to step 572. In step 572, that new agent gets the lead and the agent selection process in this example is complete. The process then passes to step 580. In step 580, the process returns to step 590 as shown in FIG. 8. That is, the lead auto-assignment has been completed for that particular lead.

Alternatively, it may be the situation that there is indeed more than one new agent in contention for the lead. As a result, the process must decide between these new candidate agents, which one should work the lead. That is, the process passes from step 572 to step 574. In step 574, the process determines whether the new agents still in contention have exactly the same A-lead inventories. If they do not have the same number of A-lead inventories, then the process passes from step 574 to step 576. In step 576, the new agent with the lowest current-week A-lead inventory gets the lead. After step 576, the process passes to step 580 and processing is continued as described above.

Alternatively, the process may determine in step 574 that the new agents do indeed have exactly the same A-lead inventories, i.e., "yes" in step 574. Then the process passes from step 574 to step 578. In step 578, the lead is randomly assigned amongst those new agents with the lowest current week A-lead inventory. It should be appreciated that rather than using such random assignments in step 578, the leads might be assigned on a type of rotational basis. However, it is further noted that the A-lead inventory of step 574, absent other processing, will inherently result in an equal distribution of the leads. That is, if two agents have the same inventories and one agent is then assigned a lead, then the next time such agents will not have the same inventory. After step 578, the process passes again to step 580.

It is appreciated that, in the situation of new agents, the choice between which new agent to choose might not be based on lead inventories, in accordance with a different embodiment of the invention. For example, the assignment of a lead might be based on a profile score associated with the new agents.

With further reference to step 552 described above, it may be the situation that there are not any "new" agents in contention for the lead. As a result, the process passes from step 552 to step 554. In step 554, the process determines whether there is more than one experienced agent in contention for the lead. If no, then the process passes from step 554 to step 560. That is, in step 560, that particular agent gets the lead. After step 560, the process passes to step 580.

Alternatively, the process may determine in step 554 that there is indeed more than one experienced agent in contention for the lead. As a result, the process passes from step 554 to step 556. In step 556, the process determines whether one of the experienced agents in contention for the lead has a higher APP (agent performance profile) score, than the rest of the agents. If yes, then the process passes to step 560 in which that agent gets the lead, i.e., the agent with the higher APP score. Alternatively, if no in step 556, then the process passes to step 562.

Figure 15:
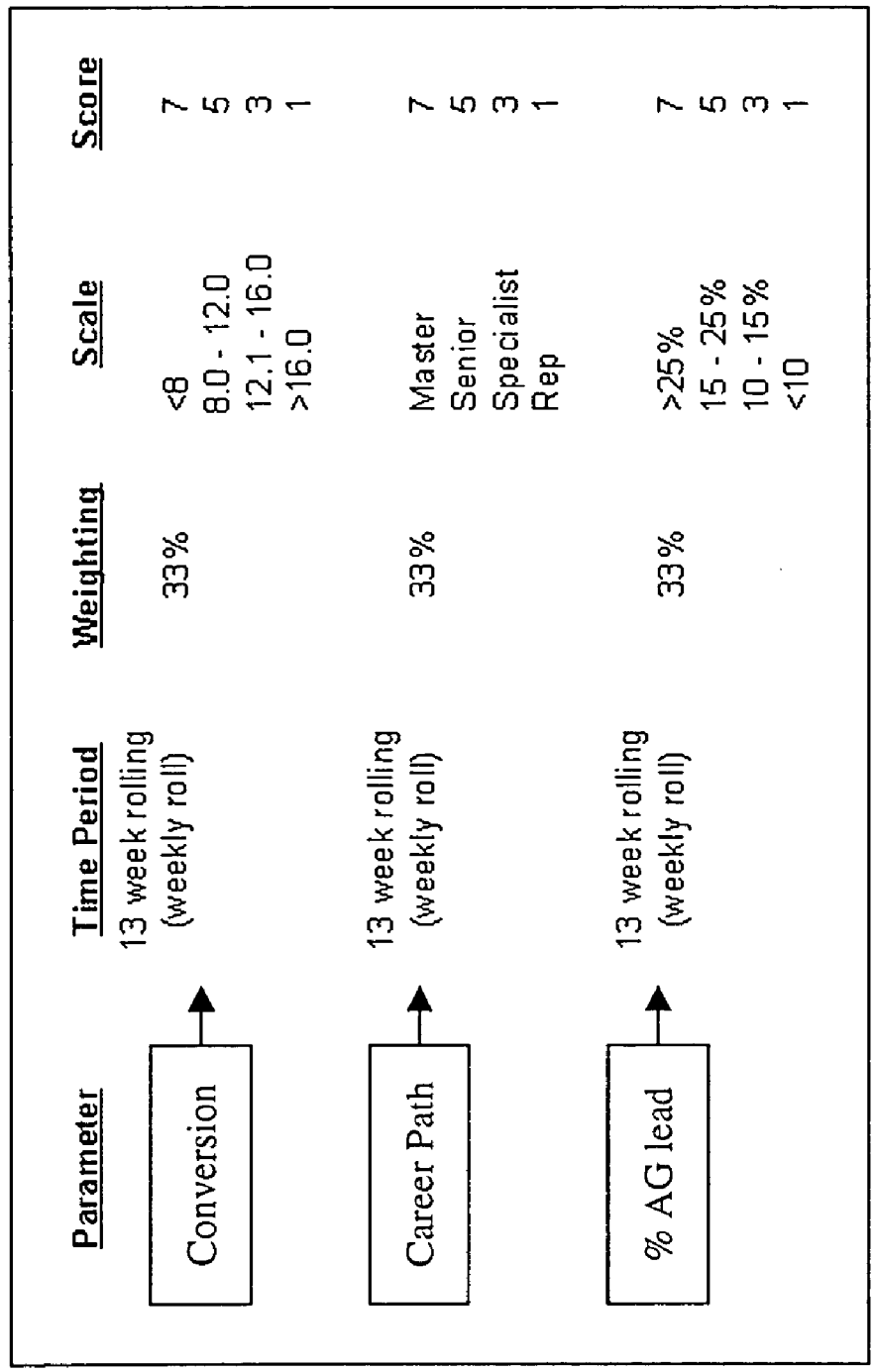
FIG. 15 is a diagram showing an agent performance profile "scoring model" in accordance with one embodiment of the invention.

FIG. 15 is a diagram showing an agent performance profile "scoring model" in accordance with one embodiment of the invention. As shown in FIG. 15, the agent performance profile may use a variety of parameters that are weighted. For each parameter, a scale may be used that results in a particular score, in accordance with one embodiment of the invention. The agent performance profile as shown in FIG. 15 might use conversations of leads to sales; the particular career path, i.e., position rank, of the agent; and/or the percentage of leads that are agent generated leads. For each parameter, the agent performance profile uses a particular rolling time period, particular weighting and a particular scale. As a result, a plurality of scores are assigned based on the parameters, which in total result in the agent performance profile score. However, it should of course be appreciated that the parameters as shown in FIG. 15 may be varied. For example, a different time period may be used other than the 13 week rolling period shown. Further, the scale may be varied as desired, for example. Further, other parameters might be used, i.e., other than the conversation, career path and agent generated lead parameters shown in FIG. 15.

In step 562 of the process, the lead is randomly assigned amongst those experienced agents with the highest APP scores. After step 562, the process passes to step 580, and processing is continued as described above.

In accordance with a different embodiment of the invention, it is appreciated that steps 556 and 562 could effectively be eliminated by the assumption that two agents would never have the same APP score. That is, the APP score might be calculated in a manner, and to sufficient decimal places, such that the likelihood of two agents having the same APP score is very low. Based on this assumption, the process of FIG. 10 would simply assign the lead to the agent with the highest score. In the unlikely event that two agents did have the same score, manual intervention might be imposed into the process.

The processing as described above determines the particular agent that is assigned the lead, in accordance with one embodiment of the invention. Once the lead is assigned, then the lead is forwarded to the particular agent for actual processing, as described below.

Figure 11:
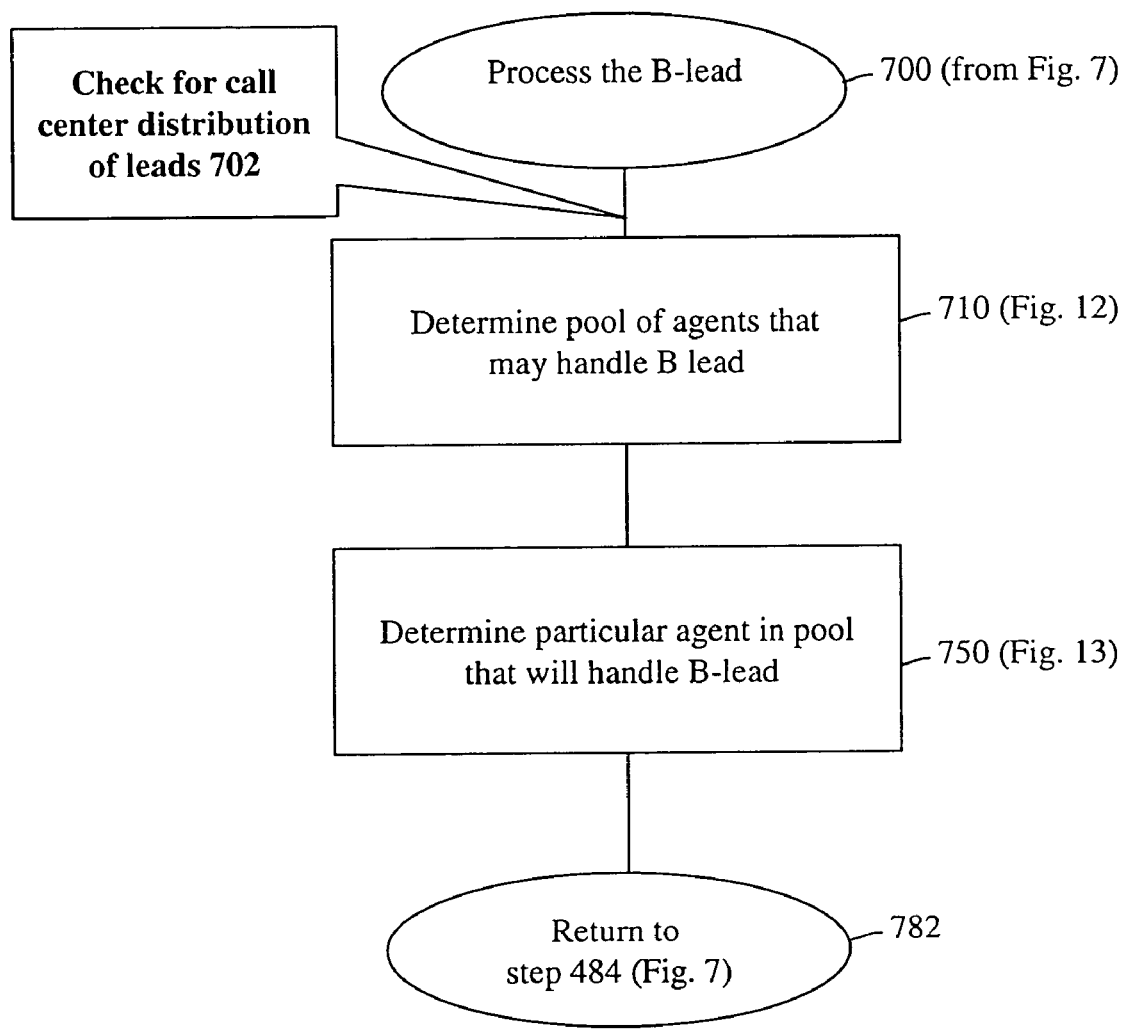
FIG. 11 is a flow chart showing the "process the B-lead" step of FIG. 7 in further detail in accordance with one embodiment of the invention.

However, it is appreciated that there may be various types of leads. FIG. 11 is a flow chart showing in further detail the processing of a B-lead, i.e., step 700 of FIG. 7. As shown in FIG. 11, the process starts in step 700. Then, the process passes to step 710. In step 710, the process determines a pool of agents that may handle the B-lead. Then, in step 750, the process determines the particular agent in that pool that will indeed handle the B-lead. After step 750, the process passes to step 782. In step 782, the process returns to step 484 as shown in FIG. 7.

In a similar manner to FIG. 8 above, FIG. 11 also shows that the processing of the B-leads might involve forwarding the B-lead or B-leads to a call center. That is, in step 702, the process deems that a particular lead has been tagged for processing by a call center and removes that lead from the further processing of FIG. 11. The lead tagged for the call center is further processed to distribute the lead to a call center, as is described below.

Figure 12:
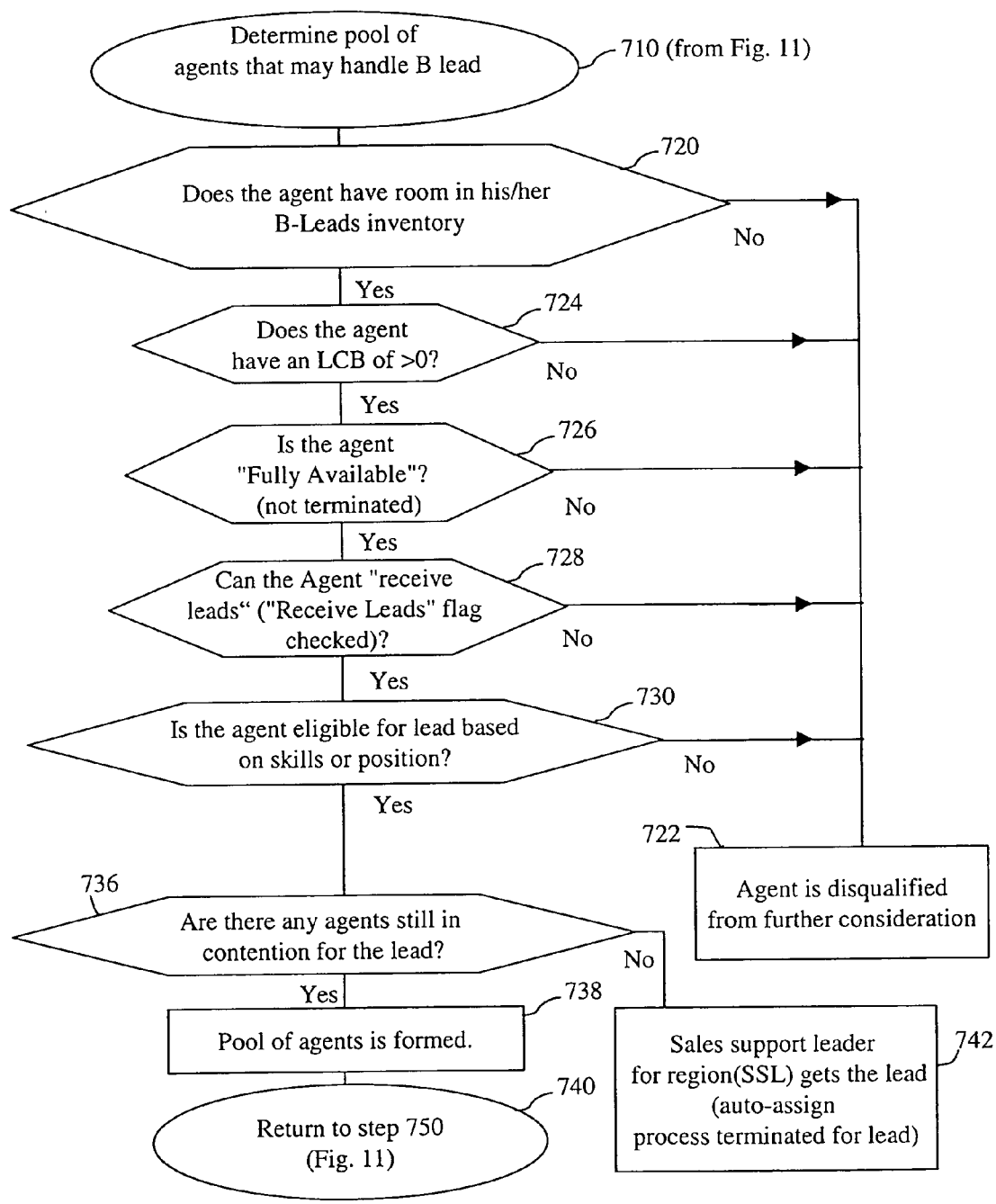
FIG. 12 is a flow chart showing the "determine pool of agents that may handle B-lead" step of FIG. 11 in further detail in accordance with one embodiment of the invention.

FIG. 12 is a flow chart showing in further detail the "determine pool of agents that may handle B-lead" step 710 of FIG. 11. As shown in FIG. 12, the sub-process starts in step 710 and passes to step 720. In step 720, the process determines whether the particular agent has room in his or her B-leads inventory. Again, this threshold might be set at any desired number. If no, then the process passes to step 722 in which the agent is disqualified from further consideration. Alternatively, it may be the situation that the particular agent being processed does not exceed the B-leads inventory required. As a result, the process passes from step 720 to step 724.

In step 724, the process determines whether the agent has an Lead Credit Balance (LCB) of greater than zero. If no, i.e., the agent does not have any credits available, then the process passes from step 724 to step 722. Alternatively, the process may determine in step 724, that the agent does indeed have a LCB greater than zero. As a result, the process passes from step 724 to step 726. In step 726, the process determines whether the agent is fully available. If no, then the process again passes to step 722. If yes in step 726, then the process passes to step 728. In step 728, the process determines whether the agent's "receive leads" flag is checked. If no, then the agent is disqualified from further consideration. However, if yes in step 728, then the process passes to step 730. In step 730, the process determines whether the agent is eligible for the particular lead based on skills and/or position, expertise required by the particular territory and/or the endorsement situation of the lead. If no, then the agent is disqualified and the process passes to step 722. However, if yes in step 730, then the process passes to step 736.

In step 736, the process determines whether there are any agents still in contention for the lead. That is, it may be the situation that all the agents have been disqualified. If no in step 736, then the process passes to step 742. In step 742, a suitable sales support leader for that particular region, in which the lead is associated, gets the lead. Accordingly, the auto-assignment process is terminated for that particular lead.

Alternatively, there may be at least one agent still in contention for the lead in step 736. As a result, the process passes to step 738. In step 738, the pool of agents is formed. Then, in step 740, the process returns to step 750 of FIG. 11.

Figure 13:
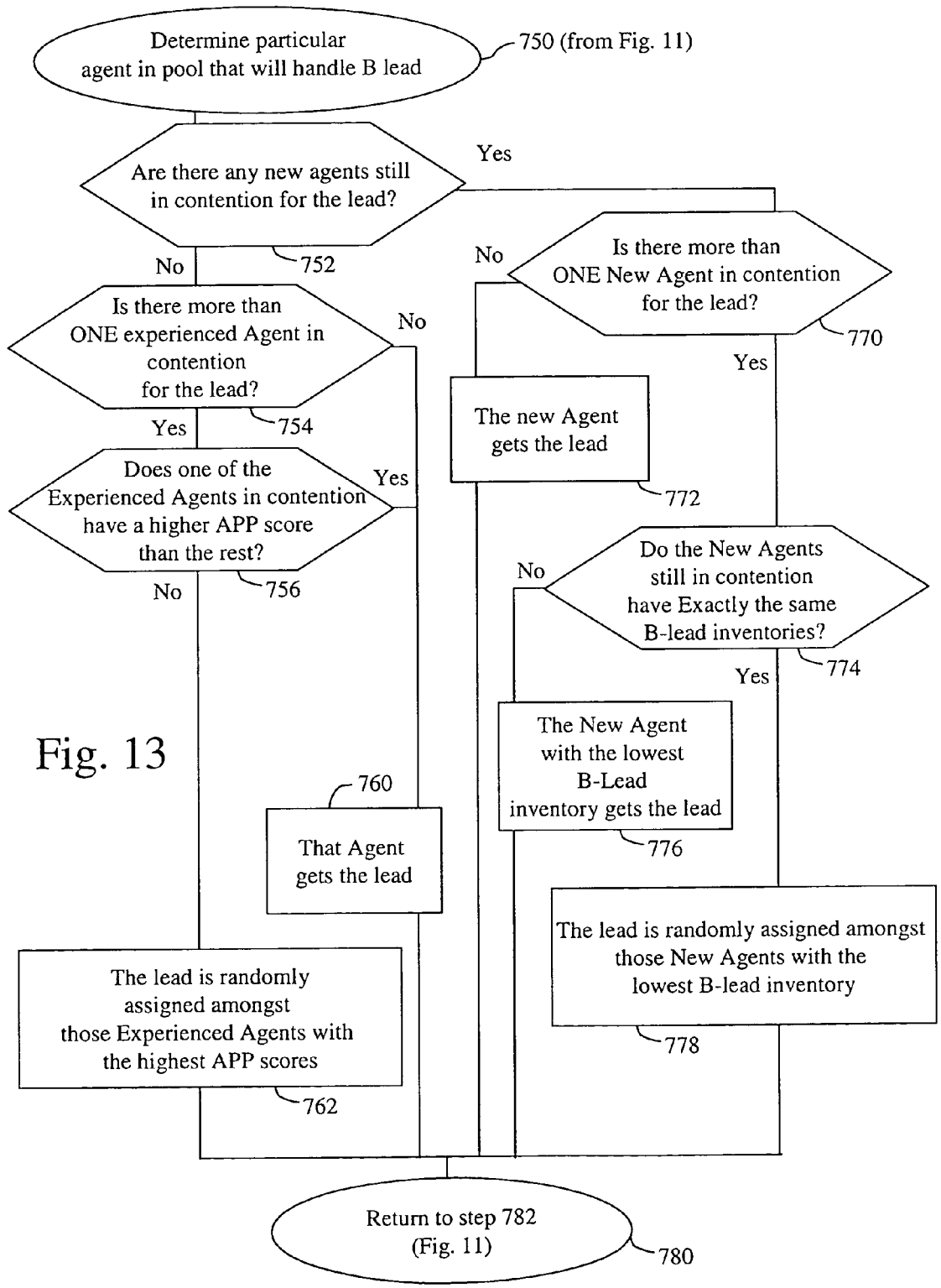
FIG. 13 is a flow chart showing the "determine particular agent in pool that will handle B-lead" step of FIG. 11 in further detail in accordance with one embodiment of the invention.

FIG. 13 is a flow chart showing in further detail the determine particular agent in pool that will handle the B-lead step 750 of FIG. 11 in further detail. As shown in FIG. 13, the process starts in step 750 and passes to step 752. In step 752, the process determines whether there are any new agents still in contention for the lead. If yes, then the process passes to step 770. That is, the processing of FIG. 13, in a similar manner to the processing of FIG. 10 described above, gives preference to new agents over experienced agents. This preference may of course be changed, as desired. In step 770, the process determines whether there is more than one new agent in contention for the lead. If no, then that particular new agent gets the lead in step 772. After step 772, the process passes to step 780. In step 780, the process returns to step 790 of FIG. 11.

Alternatively, in step 770, as shown in FIG. 13, the process may determine that there is indeed more than one new agent in contention for the lead. As a result, the process passes from step 770 to step 774. In step 774, a determination is made by the lead processing portion 40 whether all the new agents still in contention for the lead have exactly the same B-lead inventories. If no, then the particular agent with the lowest current-week B-lead inventory gets the lead as shown in step 776. After step 776, the process passes again to step 780.

Alternatively, the process may determine in step 774, that all the new agents do indeed have exactly the same B-lead inventories. As a result, the process passes from step 774 to step 778. In step 778, the lead is randomly assigned amongst those new agents with the lowest current-week B-lead inventory. After step 778, the process passes to step 780. As discussed above, in step 780, the process returns to step 782 of FIG. 11. Further processing is then continued as described above.

As described above in step 752 of FIG. 13, it may be the situation that there are not any new agents in contention for the lead. As a result, the process passes from step 752 to step 754. In step 754, a determination is made whether there is more than one experienced agent in contention for the lead. If no, then that agent gets the lead in step 760. Alternatively, it may be the situation in step 754 that there is indeed more than one experienced agent in contention for the lead. As a result, the process passes to step 756. In step 756, the process determines whether one of the experienced agents in contention for the lead has a higher APP score than the rest. If yes, then again that agent gets the lead in step 760. Alternatively, if no in step 756, then the process passes to step 762.

In step 762, the lead is randomly assigned amongst those experienced agents with the highest APP scores. After either of steps 760 or step 762, the process passes to step 780. As noted above, in step 780, the process returns to step 782 as shown in FIG. 11.

Figure 14:
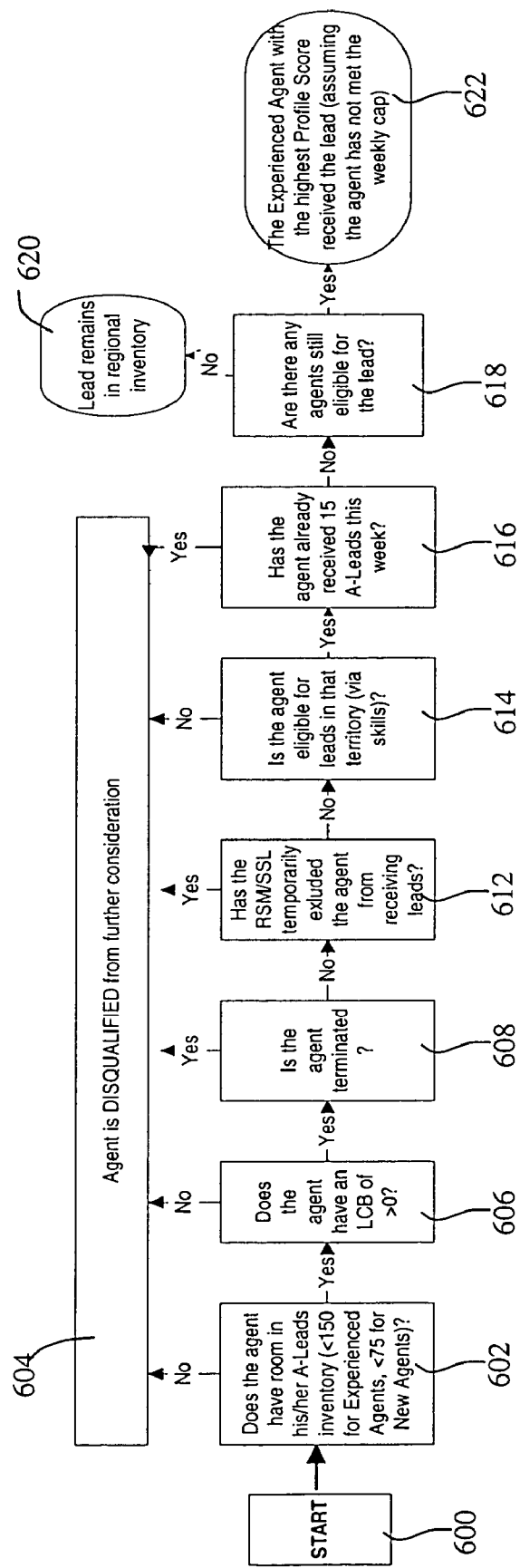
FIG. 14 is a flow chart showing automated assignment of leads in accordance with a further embodiment of the invention.

The assignment of leads in step 400 of FIG. 5 is described above in accordance with one embodiment of the invention. FIG. 14 shows the assignment of leads, and specifically A-leads, in accordance with a further embodiment of the invention. However, it is appreciated that a similar process may be used for B-leads.

As shown in FIG. 14, the process starts in step 600 and passes to step 602. In step 602, the process determines if the agent has room in his or her A-Leads inventory (<250 for Experienced Agents, <75 for New Agents). If yes, then the process passes to step 606. Alternatively, if no in step 602, then the process passes to step 604, and the particular agent is disqualified from further consideration.

In step 606, the process determines if the agent has an LCB of >0. If no in step 606, then the process again passes to step 604 and the agent is disqualified. Alternatively, if yes in step 606, then the process passes to step 608. In step 608, the process determines if the agent is terminated. If yes in step 608, then the process again passes to step 604 and the agent is disqualified. Alternatively, if the agent has not been terminated, the process passes to step 612. In step 612, the process determines whether a regional sales manager or other person has temporarily excluded the agent from receiving leads. If yes in step 612, then the process again passes to step 604 and the agent is disqualified.

Alternatively, if the process determines no in step 612, then in step 614, the process determines if the agent is eligible for leads in that territory, i.e., based upon skills and/or position. If no, the process passes to step 604. Alternatively, if yes in step 614, then the process passes to step 616. In step 616, the process checks how many A-leads the agent has received in the current week. If the agent is equal to or above the threshold, the process passes to step 604. If the agent is below the threshold, the process passes to step 618, i.e., the agent is still a candidate for the lead.

In step 618, the process determines if any agents are still eligible for the lead. If yes in step 618, then the process passes to step 622. In step 622, the experienced agent with the highest profile score receives the lead. After step 622, the process may proceed to step 790 of FIG. 5, in accordance with one embodiment of the invention. Alternately, if no in step 618, then the process passes to step 620. In step 620, the lead remains in the regional inventory for some predetermined time. That is, at a future time any leads in the inventory will again be subject to assignment processing.

Hereinafter, further aspects in accordance with one embodiment of the invention will be described with further reference to FIG. 5. As shown in FIG. 5, after the lead is assigned to an agent, the lead is distributed in step 790, as described above. That is, the lead is output from the lead processing portion 40 to the web based lead system 100. The lead may simply be viewed in the web based lead system 100 or may be stored in the lead system memory portion 110 in the web based lead system 100, in accordance with one embodiment of the invention. Once the lead is stored in the lead system memory portion 110, an agent may access the lead so as to work the lead. For example, the leads data input portion 104 might send an e-mail to an agent so as to alert an agent to check her new leads.

Figure 17:
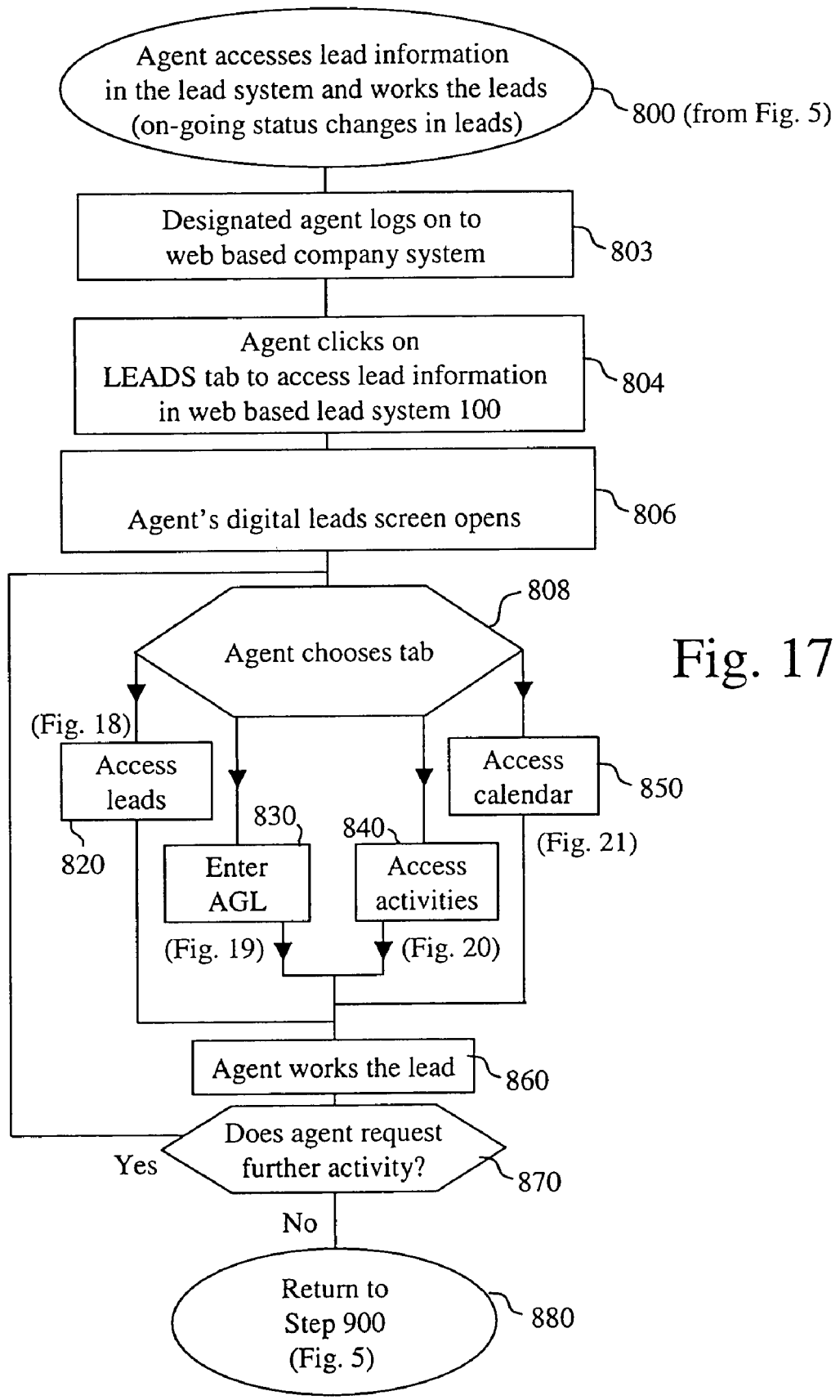
FIG. 17 is a flow chart showing the "agent accesses lead information in the lead system and works the leads" step of FIG. 5 in further detail in accordance with one embodiment of the invention.

In further explanation, FIG. 17 is a flow chart showing the "agent accesses lead information and works the lead" step 800 of the high level flow chart of FIG. 5. That is, once the processing of FIG. 17 is initiated, in accordance with one embodiment of the invention, the leads have been received in the web based lead system 100 and processed so as to be accessible by the agent designated to work the lead. Accordingly, the processing of FIG. 17, as well as FIGS. 18-21 show features of the agent interacting with the web based lead system 100, i.e., utilizing the web client 80.

As shown in FIG. 17, the process starts in step 800. Then, the process passes to step 803. In step 803, the agent logs on to the web based lead system of FIG. 1, using a suitable password and identification number, or any other suitable authorization, for example. The agent might use a web client 80, as shown in FIG. 1. After step 803, the process passes to step 804. In step 804, the agent clicks on a suitable "leads" tab to access lead information in the web based lead system 100 of FIG. 1, or in some other way selects access to the lead information. Then, the process passes to step 806. In step 806, the agent's digital lead screen opens so as to provide the agent with a variety of options. That is, after step 806 as shown in FIG. 17, the process passes to step 808.

In step 808, the agent chooses a particular tab, i.e., makes a selection, as desired. For example, the agent may access leads in step 820 and/or the agent may enter a new "agent generated" lead in step 830. Also, the agent may access activities in step 840. Alternatively, the agent may access his or her calendar in step 850, i.e., which might show appointments, for example. Further details of these process steps are described below. After each of steps (820, 830, 840, 850), the process passes to step 860.

In step 860, the agent works the lead. As is appreciated, the agent working the lead might include reviewing various materials relating to a lead, setting up appointments, and/or meeting with customers who are interested in purchasing the item or service for sale. It is appreciated that the agent might work the lead, such as meeting with a potential customer, and use the resources of the web based lead system 100, in any manner or order desired.

After step 860, the process passes to step 870. In step 870, the process determines whether the agent requests further activity. For example, step 860 might be performed by the agent making desired selections on a user interface screen generated by the web based lead system 100. If yes in step 870, i.e., the agent does indeed request further activity. As a result, the process returns to step 808 for further interaction with the agent. It is appreciated that FIG. 17 is illustrative and that an agent is free to access any of the tabs of FIG. 17 in any order, as desired. Alternatively, the agent may not request any further activity and want to exit the web page. As a result, the process passes from step 870 to step 880. In step 880, the process returns to step 900 as discussed above with reference to FIG. 5.

Figure 18:
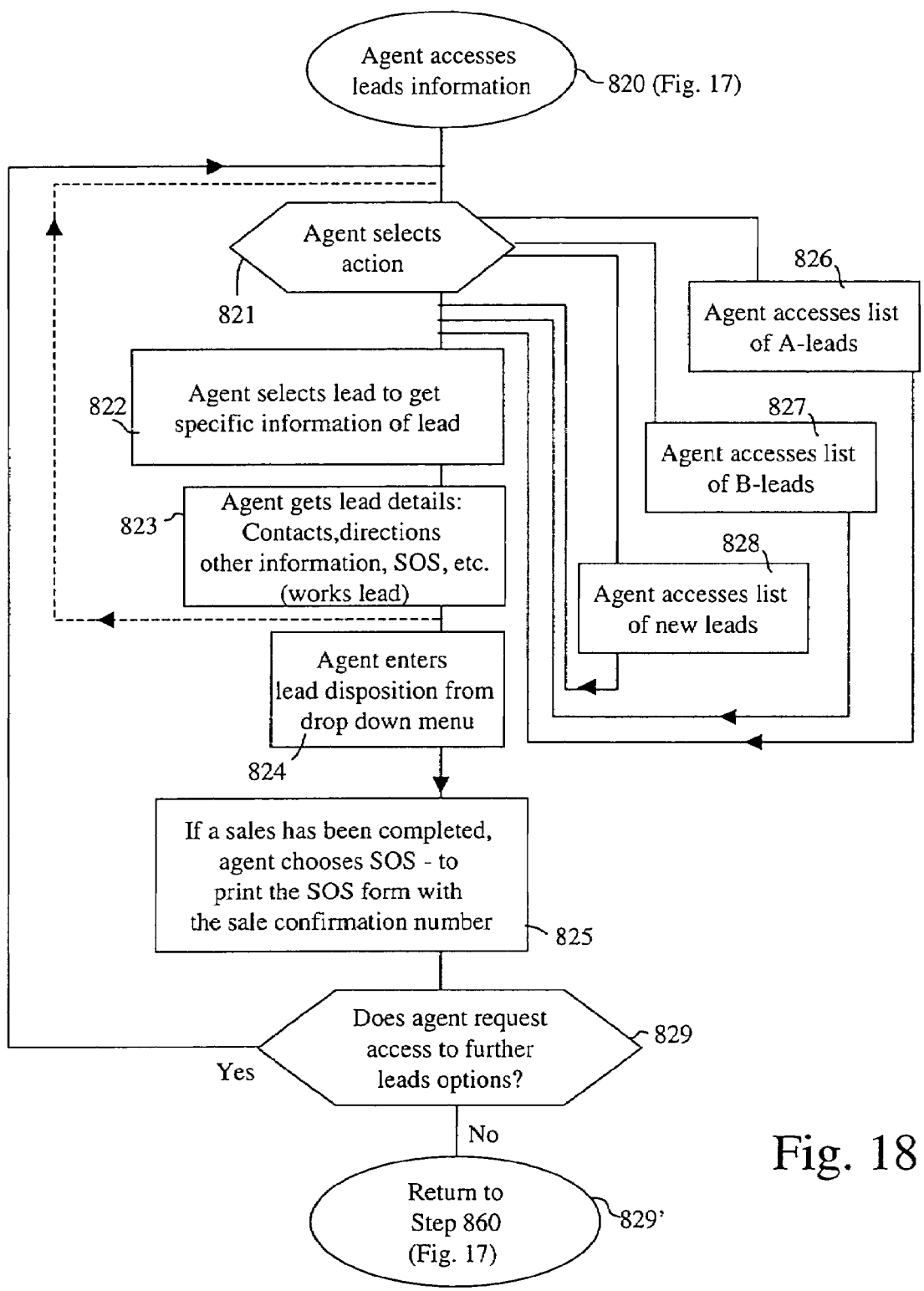
FIG. 18 is a flow chart showing the "agent accesses leads information" step of FIG. 17 in further detail in accordance with one embodiment of the invention.

FIG. 18 is a flow chart showing in further detail the "agent accesses leads" step 820 of FIG. 18. As shown in FIG. 18, the process starts in step 820 and passes to step 821. In step 821, the agent selects an action from a menu, for example.

That is, the agent may wish to access all her A-leads in step 826. Alternatively, the agent may wish to access all her B-leads in step 827. Further, in step 828, the agent is presented with the option to access a list of all the new leads that have been assigned to the agent. Once the agent accesses a list of leads, the agent may then choose a particular lead on that list. That is, the process passes from any of steps (826, 827, and 828) to step 822. Alternatively, a user might directly select a particular lead, such as by specifically identifying the lead so as to pull the lead information and/or to select the lead using a suitable search process. That is, the process may pass directly from step 821 to step 822.

After step 822, the process passes to step 823. In step 823, the agent is provided with a variety of lead details so as to work the lead. For example, these lead details might include contacts for the lead, a source of sale (SOS) number, or other needed information that the agent needs to work the lead. After step 823, the process may pass to step 824 or return to step 821.

To explain, in step 824, the agent enters a disposition of a lead. That is, the agent works the lead in step 823. Once the agent works the lead, the agent may have concluded work on the lead, i.e., such that the lead should be removed from the agent's inventory of leads to work. In accordance with one embodiment of the invention, this is performed by entering a disposition of the lead in step 824. Alternatively, the agent may not be finished working the lead, and as a result, the agent may return to step 821.

FIG. 16 is a table showing various disposition of leads in accordance with one embodiment of the invention. The particular disposition that is assigned to a lead determines further processing of the lead. The lead disposition might be to suppress the lead, that an additional application has been submitted by a potential client relating to an existing lead, to rework the lead, or to put the lead into a sleep disposition. The lead processing might be suppressed, i.e., stopped, since the particular person is deceased, for example. Alternatively, the disposition might be to "rework" the lead (assigning the lead to a different agent) since the lead has aged 90+ without being worked, for example. Further aspects of the lead dispositioning process are described below.

With further reference to FIG. 18, assuming the agent is done working the lead and the process had passed to step 824 in which the agent enters the lead disposition, the process passes to step 825. In step 825, the agent may choose from various forms related to working the leads, in accordance with one embodiment of the invention. As shown in step 825, the agent may select an SOS form (Source of Sale) if the sale of a lead has occurred. Any of a wide variety of other menu options may be made available to assist the agent in concluding work on a lead.

After step 825, the process passes to step 829. In step 829, the user is again presented with the option to choose further menu options as the agent desires, e.g., to select a further lead. If the agent does not wish to select any further menu options, the process passes from step 829 to step 829'. In step 829', the process returns to step 860 of FIG. 17.

Figure 19:
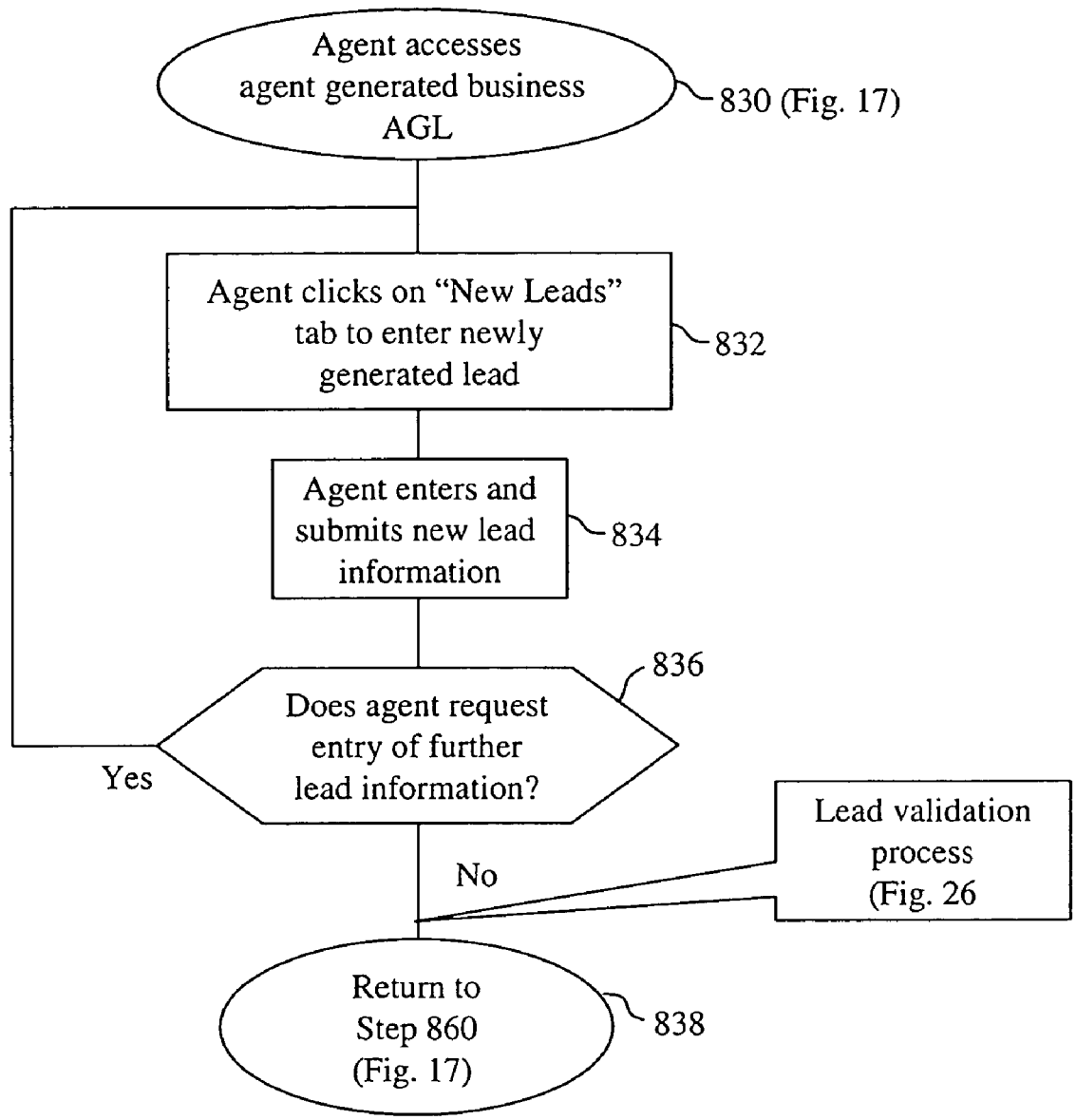
FIG. 19 is a flow chart showing the "agent accesses agent generated business" step of FIG. 17 in further detail in accordance with one embodiment of the invention.

FIG. 19 is a flow chart showing in further detail the agent accesses agent generated lead (AGL) step 830 of FIG. 17. As shown in FIG. 19, the process starts in step 830 and passes to step 832, in step 832, the agent clicks on a "New leads" tab so that the agent may enter information regarding a new lead that the agent has generated. Then, the process passes to step 834. In step 834, the agent enters and subsequently submits the new lead information. Then, the process passes to step 836. In step 836, the process determines whether the agent requests entry of any further lead information. If yes, then the process returns to step 832.

Alternatively, if no in step 836, i.e., the agent does not request entry of further lead information, then the process passes to step 838. In step 838, the process returns to step 860 as shown in FIG. 17.

Figure 26:
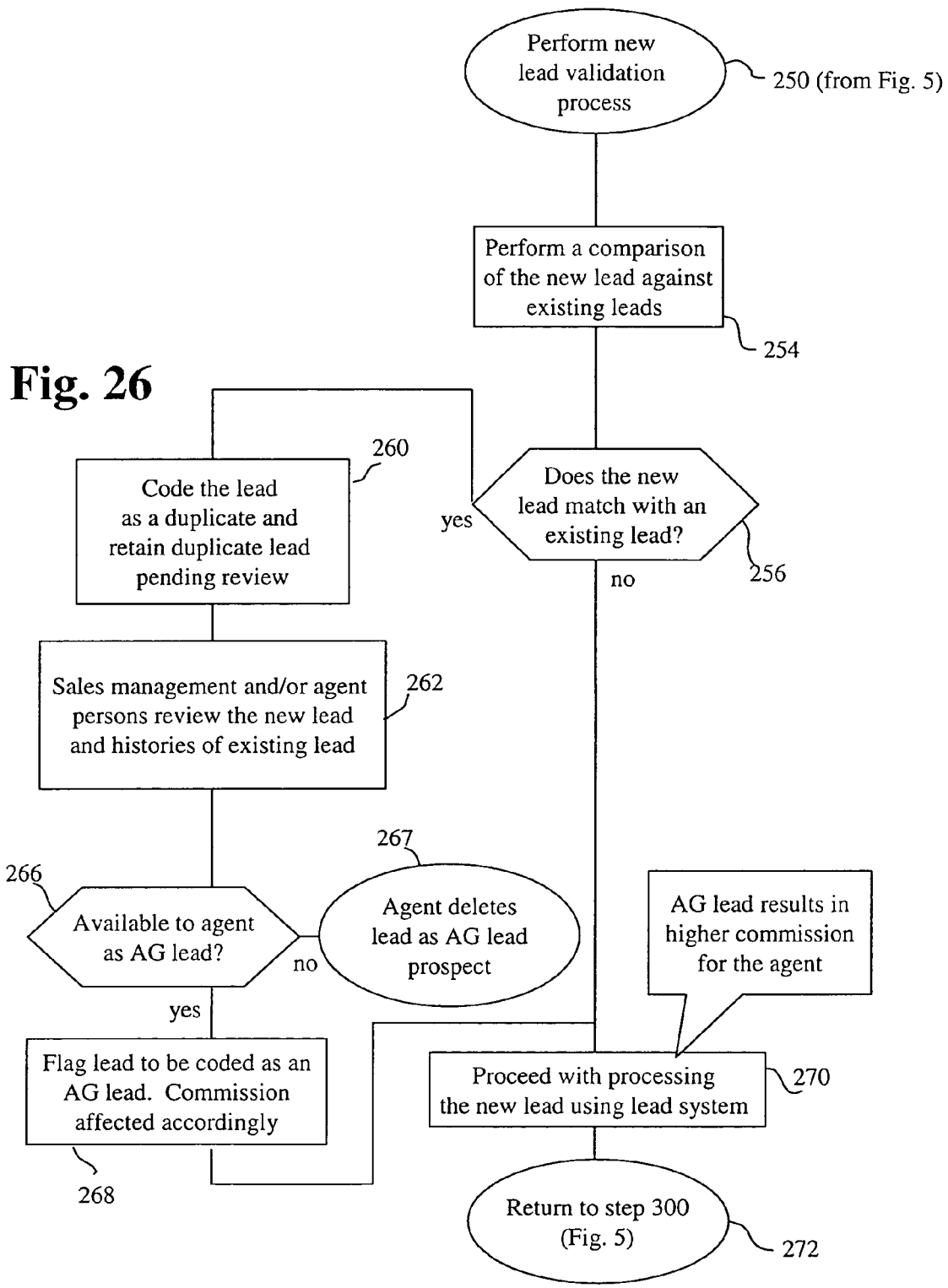
FIG. 26 is a flowchart showing further details of the "perform new lead validation process" step of FIG. 5 in accordance with one embodiment of the invention.

As reflected in FIG. 19, it is appreciated that the agent generated new lead is subjected to a validation process in a similar manner to company generated new leads. This validation process might be performed on a periodic basis such that an agent is aware of whether the new lead will be counted as an agent generated lead. As described below, FIG. 26 is a flowchart showing a validation process in accordance with one embodiment of the invention.

Figure 20:
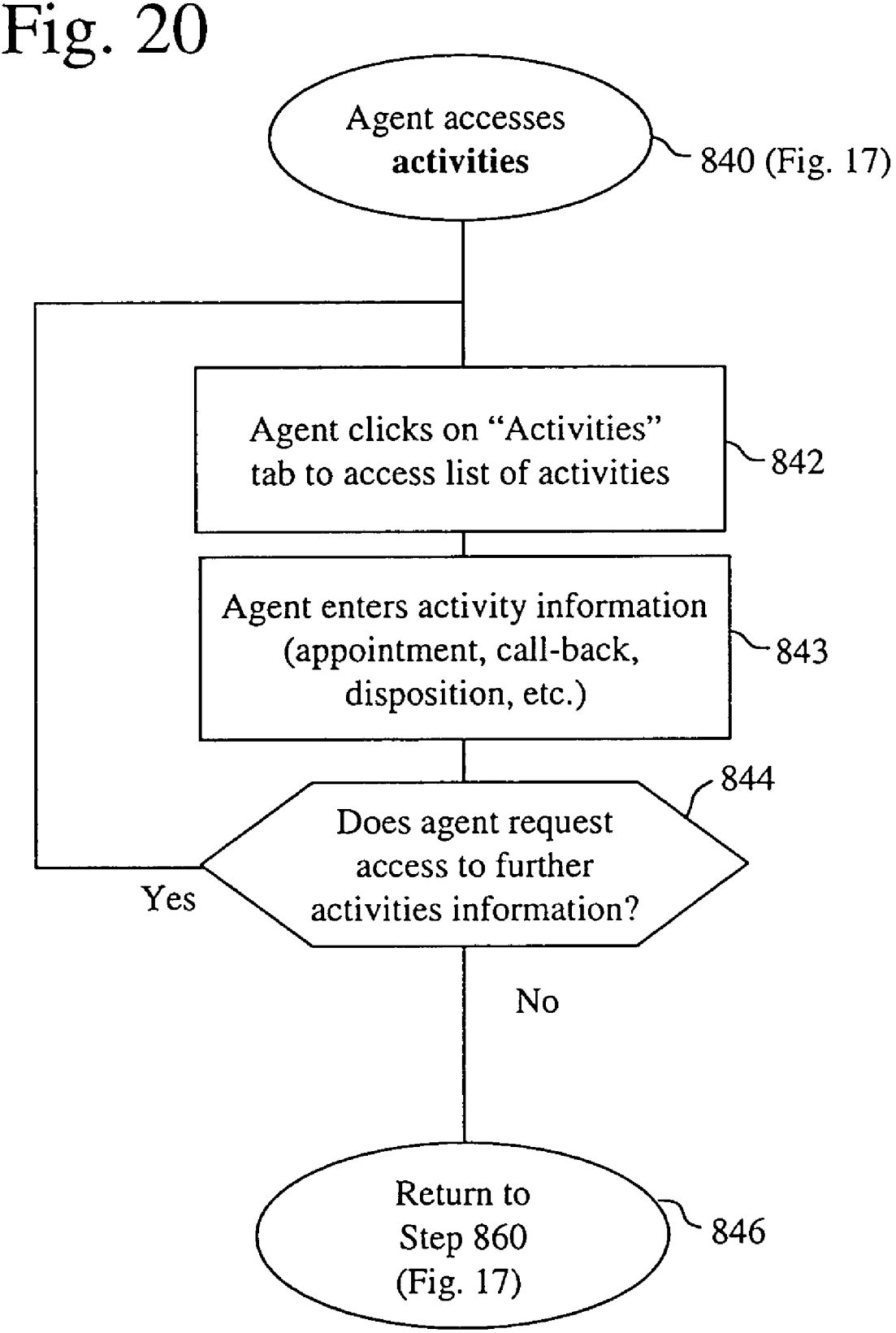
FIG. 20 is a flow chart showing the "agent accesses activities" step of FIG. 17 in further detail in accordance with one embodiment of the invention.

FIG. 20 is a flow chart showing in further detail the agent accesses activities step 840 of FIG. 17. As shown in FIG. 20, the process starts in step 840 and passes to step 842. In step 842, the agent clicks on the "activities" tab to access a list of activities. The displayed activities may be any of a wide variety of activities or action steps associated with working a particular lead that might be needed and/or of interest to the agent working that lead. For example, the activities might include an appointment relating to the lead or call-back information. Then, the process passes to step 843.

In step 843, the agent may enter an activity, i.e., such as a new appointment for a lead. The activity information may in particular relate to deposition information of the lead. Then, in step 844, the process determines whether the agent requests access to further activities information. If yes, then the process returns to step 842. Alternatively, if no in step 844, then the process passes to step 846. In step 846, the process returns to step 860 of FIG. 17.

Figure 21:
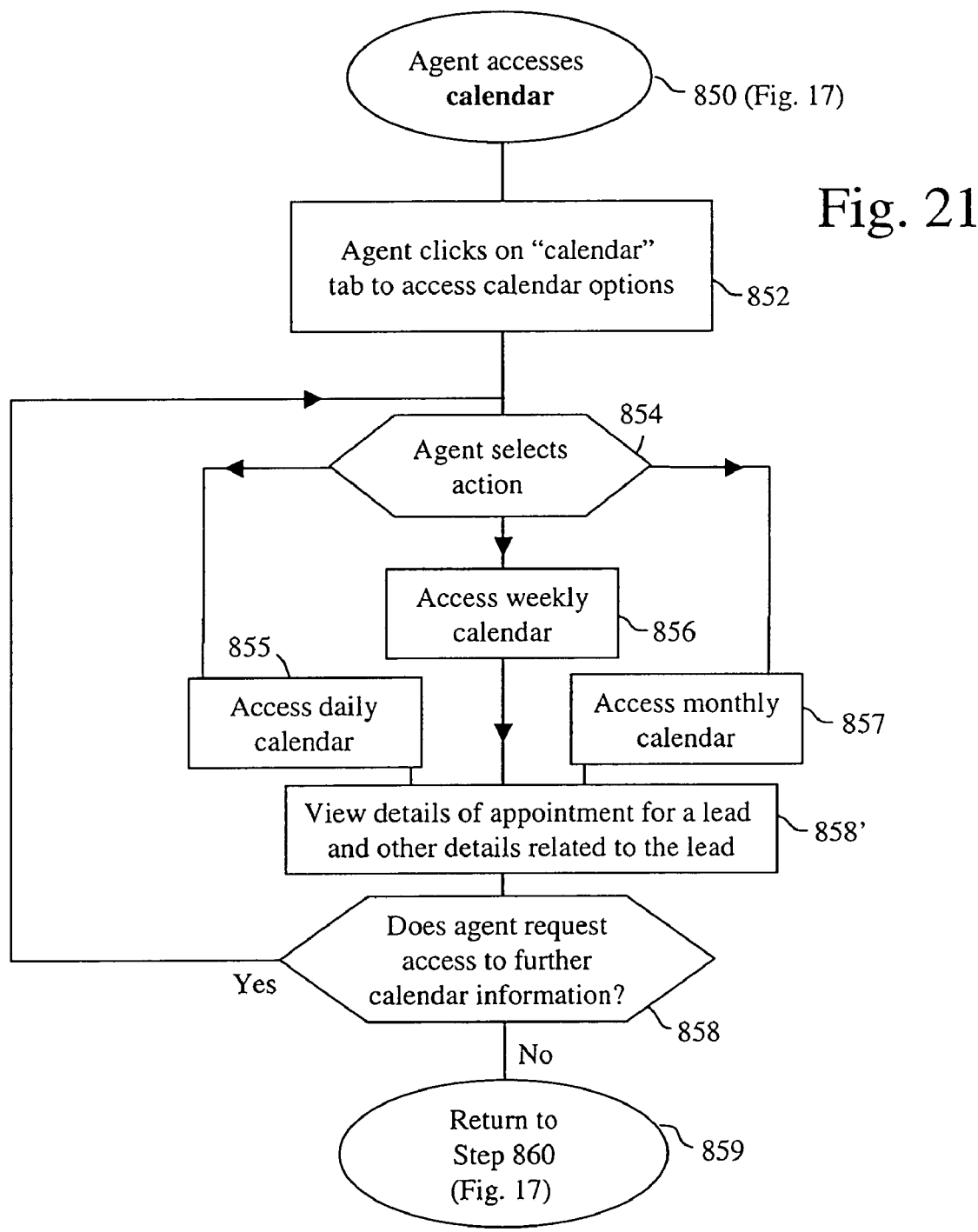
FIG. 21 is a flow chart showing the "agent accesses calendar" step of FIG. 17 in further detail in accordance with one embodiment of the invention.

FIG. 21 is a flow chart showing in further detail the agent accesses "calendar" step 850 of FIG. 17. As shown in step 21, the process starts in step 850 and passes to step 852. In step 852, the agent clicks on "calendar" tab to access calendar options. However, it should of course be appreciated that the calendar option might be activated in any suitable manner. After step 852, the process passes to step 854. In step 854, the agent selects a particular action desired. That is, the agent selects whether to access a daily calendar in step 855, whether the agent wishes to access a weekly calendar in step 856, or alternatively, whether the agent wishes to access a monthly calendar in step 856.

After each of steps (855, 856, 857) the process passes to step 858'. In step 858', the agent may view the details of a particular appointment shown on the agent's calendar. These details might include appointment time and location, for example. Then, in step 858, a determination is performed whether the agent requests access to further calendar information. If yes, then the process returns to step 854 in which the agent is provided with the option to make further selections. This processing may of course be effected using any of a variety of menu options or arrangements.

Alternatively, in step 858, the agent may not request access to further calendar information. As a result, the process passes from step 858 to step 859. In step 859, the process returns to step 860 of FIG. 17.

Figure 22:
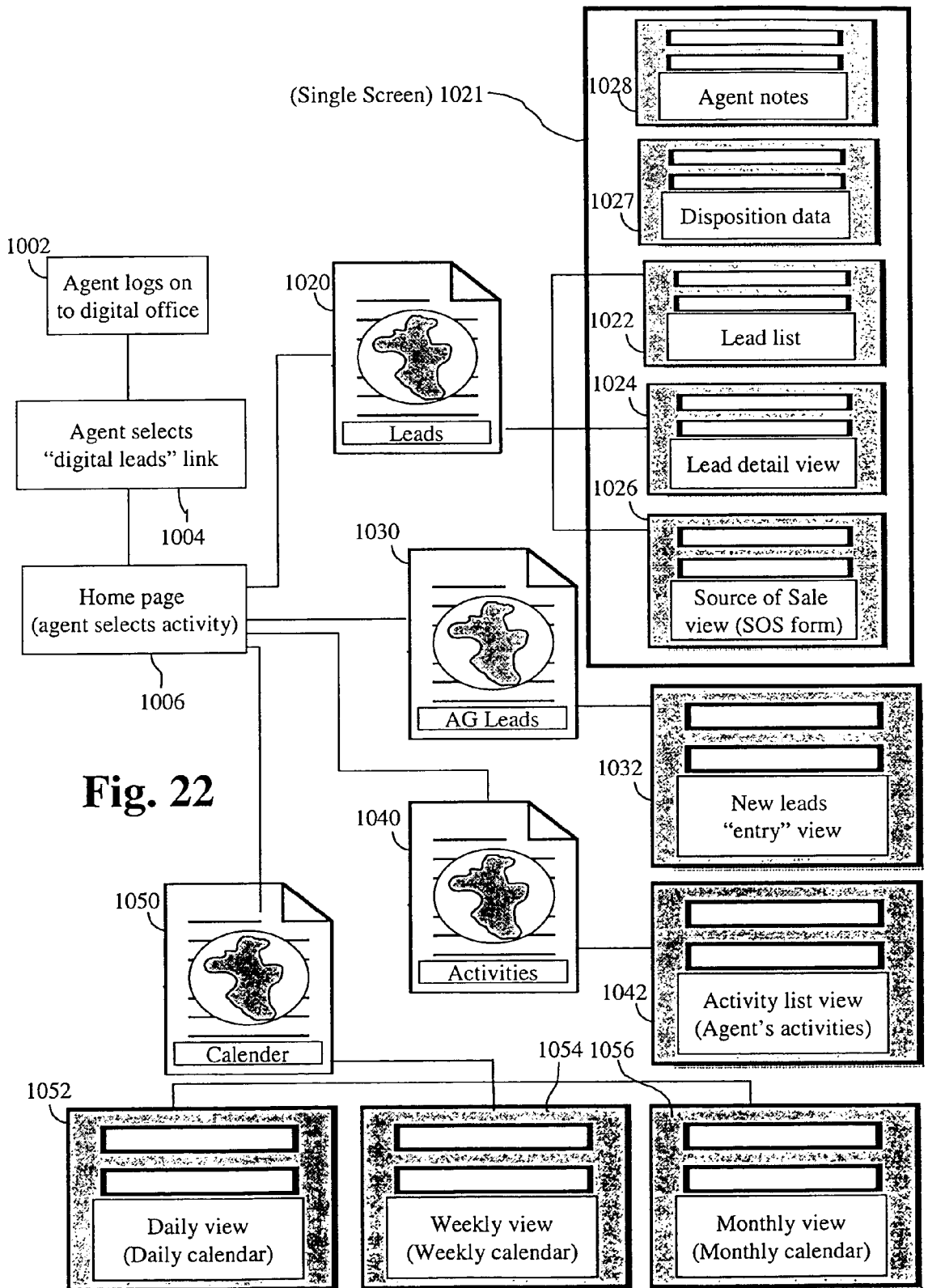
FIG. 22 is a flow diagram showing further aspects of an agent utilizing the web based lead system in accordance with one embodiment of the system and method of the invention.

FIG. 22 is a diagram showing further aspects of an agent accessing the web based lead system, in accordance with one embodiment of the invention. Accordingly, FIG. 22 shows further details of the processing related to the flow charts of FIGS. 17-21, as described above. As shown in FIG. 22, the process starts at step 1002 in which the agent logs onto the web based lead system. Then, in step 1004, the agent selects the "digital leads" link. This in turn results in the display of a page to the agent in step 1006. The page allows the agent to select a desired activity. That is, the agent is provided with the opportunity to go to a variety of pages. For example, the agent may go to a leads page 1020, an AG leads page 1030, an activity page 1040, and/or a calendar page 1050.

Further, a variety of views are accessible from each page. That is, if the agent accesses the leads page 1020, then the agent is provided with access to a "lead list" 1022, a "lead detail view" 1024, or alternatively, an SOS view 1026. For example, the lead list view 1022 might provide the agent with a list of leads that have been worked before separately from a list of leads that have not been worked before.

Further, a "disposition information" view 1027 and an "agent note information" view may be provided. The disposition view 1027 provides the agent with information regarding the disposition of the leads. The agent note information view 1028 allows the agent to enter and then review various notes regarding a lead or leads. In accordance with one embodiment of the invention, the SOS view 1026, the disposition information" view 1027 and the "agent note information" view 1028, as well as the views 1022 and 1024, are presented on a single viewable screen 1021, for viewing by the agent at one time.

In accordance with one embodiment of the invention, the agent notes might include two types of notes. One type of notes might be private notes that no other agent can see. A further type of notes might be shared notes, i.e., that other agents and persons can indeed see. Further, the source of sale information relates to the splitting of commissions with other agents or persons involved in processing the lead. For example, the commission might be split between a person responsible for the marketing effort that resulted in the lead, a person who secured an endorsement, and/or some other agent or person who contributed in securing and processing the lead.

Alternatively to the above views, the agent may access the AG lead page 1030. As a result, this provides the agent access to a new leads "entry" view 1032, i.e., in which the agent may enter information regarding a new lead. Further, the agent may access the activities page 1040. This page provides the agent access to view an activity list 1042. The activity list view 1042 includes various information regarding the agent's activities. Lastly, the agents may access the calendar page 1050. The calendar page 1050 allows the agent to access a variety of calendar views, such as the daily view 1052, a weekly view 1054, and/or the monthly view 1056, for example.

Accordingly, the systems and methods of the invention allow an agent to effectively monitor and process their own generated leads in conjunction with processing company generated leads using the same system. This results in efficiency since the agent is not then using some other system or arrangement to process their own generated leads.

Hereinafter, further aspects of the invention relating to the high level flowchart of FIG. 5 will be described, and in particular, aspects relating to validating a lead. As described above, it should be appreciated that a variety of steps may be performed on a lead to verify that the lead is indeed a valid lead. In particular, this validation may occur in the situation where an agent herself has submitted the new lead for processing.

In accordance with one embodiment of the invention, a new lead validation process takes new leads and performs various processing on the new leads. For example, it may be the situation that a new lead was entered by a sales agent. The validation process compares the lead information against an established marketing responder database. If the process determines that there are "matches" to the new lead, then the new lead is not immediately loaded into the new lead database. Instead, the new lead might be suitably coded as a "duplicate" lead. For any duplicate leads, the particular lead might be subject to agent and/or sales management review. Such persons might compare the "agent generated" lead with the previous lead, which appears to be a duplicate, to determine the submitting agent's entitlement to the lead as an "agent generated" lead. For example, an agent generated lead might be created when a client refers the agent to a relative of the client, i.e., thus generating a sales lead. An agent generated lead may typically result in a higher commission rate to the particular agent for that lead. As used herein, a "sales management person" is a person that has some oversight authority in the handling of leads by the agents and the securement of sales based on those leads, for example.

On the other hand, it may be the situation that for a given lead, which was submitted by an agent, there are no "matches." In accordance with one embodiment of the invention, these leads are automatically loaded with suitable coding designating the lead as an "agent generated" lead, i.e., resulting in a higher commission rate for the agent.

FIG. 26 is a flowchart showing further details of step 250 "perform new lead validation process" of FIG. 5. The processing of step 250 may be performed by the new lead validation portion 49 (as shown in FIG. 2), in accordance with one embodiment of the invention. The lead validation processing may be performed in parallel with an agent working the lead, i.e., if the agent generated the lead, that agent can proceed with working the lead while the processing of FIG. 26 is performed.

As shown in FIG. 26, the process starts in step 250. Then, the process passes to step 254. In step 254, the process performs a comparison of the new lead against existing leads. This comparison may be performed in a variety of manners, such as comparing corresponding data fields in the respective leads or using a suitable lead identification number, discussed further below.

After step 254, the process passes to step 256. In step 256, the process determines whether the new lead matches with any existing leads. If no, then the process passes to step 270. In step 270, the process proceeds with processing the new lead using the automated lead processing portion, as described in detail above. That is, in step 272, the process returns to step 300 of FIG. 5.

In accordance with a related aspect of the invention, each lead may be provided with a unique "lead identifier number."

The lead identifier number might be based on the client's last name and address, for example. Any known technique may be used to generate the lead identifier number, for use as described herein. The lead identifier number may be used to compare a new lead against existing leads so as to determine if the new lead is duplicative.

As described above, in step 256, the process determines whether the new lead matches with an existing lead. This comparison might be performed using a lead identifier number. It may be the situation that the new lead does indeed match with an existing lead. As a result, the process passes from step 256 to step 260. In step 260, the lead is tagged as a duplicate lead and the new lead is retained in the lead processing portion pending a review of the lead. The process then passes to step 262, as shown in FIG. 26.

In step 262, a sales management person and/or an agent person reviews the attributes of the new lead. Then, in step 266, a determination may be made whether the new lead should be made available to the agent as agent generated business, i.e., if the lead was indeed submitted as an agent generated lead. If the process, which typically involves human input, determines that the lead should not be made available to the agent as an AG lead, the process passes to step 267. In step 267, the agent is made aware of the adverse decision and deletes the "agent generated lead" prospect, i.e., the agent knows that they will not get the higher commission rate. In accordance with one embodiment of the invention, the processing of that particular lead ends in step 267.

A variety of factors may be considered in determining whether an agent should receive a higher commission, even though a particular new lead is a duplicate. For example, the history of the earlier lead may be viewed by appropriate persons to see if the same agent worked on the lead, i.e., as is now submitting the duplicate lead as new business. If the agent had not worked on the lead, then the duplicate lead might never-the-less be deemed to be agent generated business. Alternatively, if the agent had worked on the lead before, then the duplicate lead would not be deemed to be agent generated business.

Alternatively, in step 266 of FIG. 26, the process may determine that even though the lead is technically a duplicate, it is still appropriate to designate the lead as agent generated business. Accordingly, if yes in step 266, the process passes from step 266 to step 268. In step 268, the lead is flagged to be coded as an agent generated lead. The agent's commission will be affected accordingly. After step 268, the process passes to step 270, and proceeds as described above.

The method of the invention as shown in FIG. 26 and described above can be used to efficiently and consistently ensure "agent generated" leads are properly evaluated by sales management and that a resulting commission or commissions, which are paid to a requestor agent, is accurate. As described above, the agent generated lead is tagged accordingly as an "agent generated lead."

It is appreciated that information regarding agent generated leads may be extensively used for a wide variety of purposes. For example, as cross-sell opportunities between sales channels are identified, accurately tracking and validating the original source of a lead is useful in meeting privacy requirements as well as ensuring accurate agent commissions and endorsement partner dues.

It should further be appreciated that the validation process as described herein is not limited to be used in conjunction with the particular processing of FIGS. 1-22. Rather, the validation processing may be also used in other relevant sales channels in which it is desired to evaluate factors to ensure accurate commissions to agents as well as accurate payments to endorsement partners.

Hereinafter, further aspects of the systems and methods of the invention will be described relating to working of the leads. As described above, an agent is assigned a lead and that lead is then distributed and made accessible to the agent. Over time, the agent may work the lead to result in various dispositions of the lead. Optimally, the final disposition of the lead will result in a sale. However, on the other hand, it is also typical for the lead not to result in a sale. A wide variety of circumstances can effect the working of the lead, so as to influence the "disposition" of the lead after the lead has been worked for a period of time. For example, relevant persons may become unavailable for a period of time and/or funding may become unavailable so as to result in the non-conversion of a lead to a sale. However, it may well be the case that an adverse situation causing the non-conversion of a lead may cure itself over time. Accordingly, efficiency dictates that the lead be shelved for working at a later date.

Further, the length of time that a lead "sleeps" may be determined based on a variety of factors. For example, in a particular region it might be determined by experience or statistical analysis that 60 days is an optimal time to shelve a B-lead. However, this optimal time might be adjusted based on further parameters. For example, the supply of A-leads in a region might be short so as to decrease the workload on agents to below desired levels. As a result, the B-leads might be taken up sooner.

In accordance with one embodiment, the invention provides automated lead management to handle variously disposed leads that have already been worked by an agent. The automated lead management uses "disposition rules," in accordance with one embodiment of the invention. To explain further, the process automates the handling of sales leads based on the last "disposition," i.e., outcome, of the lead. This disposition of the lead might be provided by an agent or decided by management, for example.

In accordance with one embodiment of the invention, a "disposition code" segments the "worked" leads into groups of leads, i.e., segments of leads. Each segment is then automatically handled or queued in an appropriate way commensurate with its now designated value. A suitable "rule table," i.e., a look-up table of sorts, might be used by the lead processing portion 40, for example, to provide the association between the disposition of a lead and the manner in which that lead should be processed. The process may use the dispositions as shown in FIG. 16 and discussed above.

Further, the systems and methods of the invention may provide "auto-disposition." That is, it may be the situation that a lead in an agent's inventory is not reworked in a timely fashion. As a result, in accordance with one embodiment of the invention, an "auto-disposition" process is performed. The auto-disposition process designates a "pseudo" outcome automatically removing the sales lead from the assignee's inventory. As a result, the lead is immediately available for rework by some other agent to which the now B-lead is assigned.

To explain further, once a lead is assigned to an agent, it may be the expectation that the lead should be worked, and the agent able to submit a final disposition of the lead, in 30 days. However, if an agent has had a lead 90 days, for example, without working the lead, the lead may be subject to an auto-disposition process. That is, the lead may be removed from the agents inventory and forwarded to another agent's inventory as a B-lead using the lead system as described herein. The auto-disposition process designates a "pseudo"

outcome because the real outcome of the led is not known. The auto-disposition process might also be implemented when an agent is terminated, for example.

In accordance with a further embodiment of the invention, the method provides "auto-aging" of leads, i.e., a "sleep" stage. That is, when appropriate, some dispositions will automatically trigger a lead to enter a "sleep" stage. This auto-aging of the lead will ensure that a lead is only reworked after a designated amount of time. This designated time is typically a later date that will more likely result in conversion of that lead to a sales.

In accordance with one aspect of dispositioning, an agent may associate a disposition to the sales lead indicating that the sales lead is to be reworked. This might occur in a situation that the agent is going on vacation and wishes to release her leads for other agents to work, i.e., in a situation where the first agent has not yet worked the lead. Accordingly, the agent assigns a dispositioning code to the lead indicating that the lead should be immediately reworked. As a result, further processing is controlled so that the sales lead is forwarded to a second agent for working the sales lead without suppressing the sales lead, i.e., the lead is essentially forwarded immediately to be assigned to a further agent.

Figure 27:
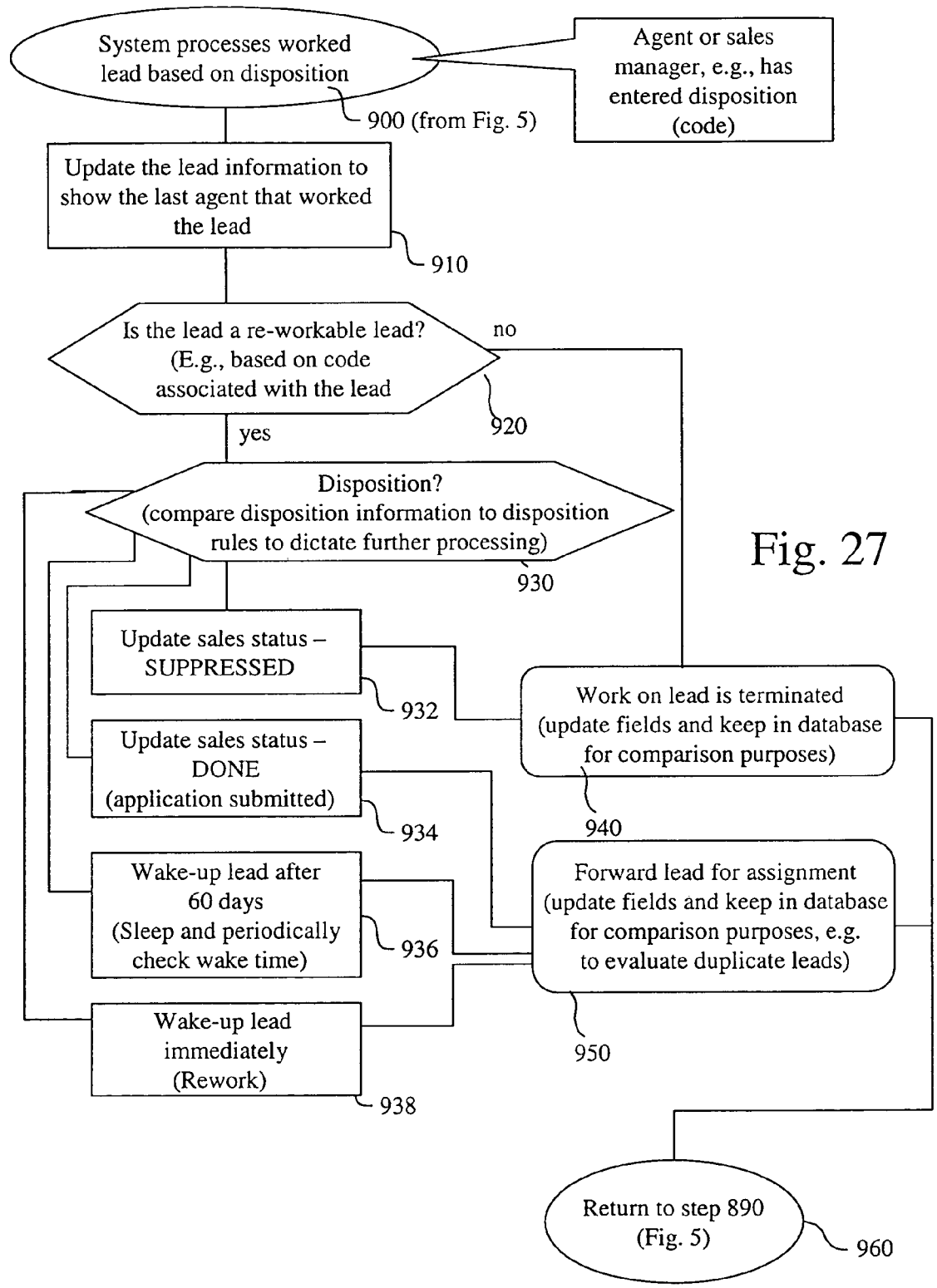
FIG. 27 is a flowchart showing in further detail the "system processes worked leads based on disposition" step of FIG. 5 in accordance with one embodiment of the invention.

In further explanation of these features of some embodiments of the invention, FIG. 27 is a flowchart showing in further detail the "process worked leads based on disposition" step 900 of FIG. 5.

As shown in FIG. 27, the process starts in step 900. That is, as described above, an agent or a manager, for example, has entered a disposition code. The process of FIG. 27 processes the lead based on that disposition code. After step 900, the process passes to step 910. In step 910, in accordance with one embodiment of the invention, the process updates the lead information to show the agent who last worked the lead. Then, in step 920, the process determines whether the lead is or is not a reworkable lead. If no, then the process passes directly to step 940. In step 940, the lead is kept in a suitable database for comparison purposes later. For example, a lead that is clearly not re-workable is a lead that has resulted in a sale.

If the lead is a re-workable type lead, the process passes from step 920 to step 930. In step 930, the process determines the disposition of the lead based on the disposition code associated with the lead. Based on the disposition code, the process proceeds with applying a set of rules to the particular lead, i.e., to control further processing of the lead.

For example, based on the disposition code, the process may pass to step 932. In step 932, the sales status is updated and the lead is suppressed. FIG. 16 discussed above describes various situations in which the lead might be suppressed. After step 932, the process also passes to step 940. In step 940, work on the lead is terminated.

Alternatively, the disposition code may dictate that the process passes to step 934. In step 934, the process determines that a new application has been submitted for an existing lead. As a result, the process passes to step 950. In step 950, the process forwards the lead for assignment. Further, the process updates the lead fields to reflect the status and retains the lead in a suitable database for comparison purposes, i.e., for comparing with other leads.

Alternatively, the process may pass to step 936. In step 936, the process places the particular lead into a sleep state. As a result, the particular lead will be resurrected after some pre-determined period of time. After step 936, the process passes to step 950, and the lead is forwarded for assignment, as described above.

Alternatively, the process may pass to step 938. In step 938, the disposition code associated with the lead dictates that the lead should be immediately reworked. As a result, the particular lead will be forwarded immediately for reworking. Accordingly, after step 938, the process passes to step 950, and the lead is forwarded for assignment, as described above.

After either of steps 940 or 950, the process passes to step 960. In step 960, the process returns to step 980 of FIG. 5. FIG. 27 is illustrative of processing in accordance with one embodiment of the invention. However, the disposition code that is associated with a particular lead might be used to dictate any of a variety of further processing for the particular lead.

In accordance with some embodiments of the invention, the method of the invention ensures optimal rework of lead inventories. Through "dispositions" of the leads submitted by an agent and/or management, sales leads can be either reworked immediately, "auto-aged" for a defined period of time, or suppressed from being reworked, for example. This automated lead management process drives consistency in lead handling that is difficult to achieve with a time-consuming manual process. This also ensures optimal use of an agent's time as only those leads that are optimal for possible conversion will be available for rework. Automated lead management, using the disposition rules, can also drive adherence to customer-provided suppression requests and related company policies, for example. Further, the dispositioning processing may be done in a batch manner.

The disposition process described herein can be used in the processing of all leads, ensuring the efficient rework of lead inventories. As a business model diversifies into other sales channels, this can be used more extensively. As multi-product and multi-channel opportunities are identified, accurate handling and rework of lead inventories is important in meeting customer needs as well as optimizing company performance. This disposition process can be shared across relevant sales channels where inventory handling is important to sales force efficiency and customer satisfaction.

Figure 28:
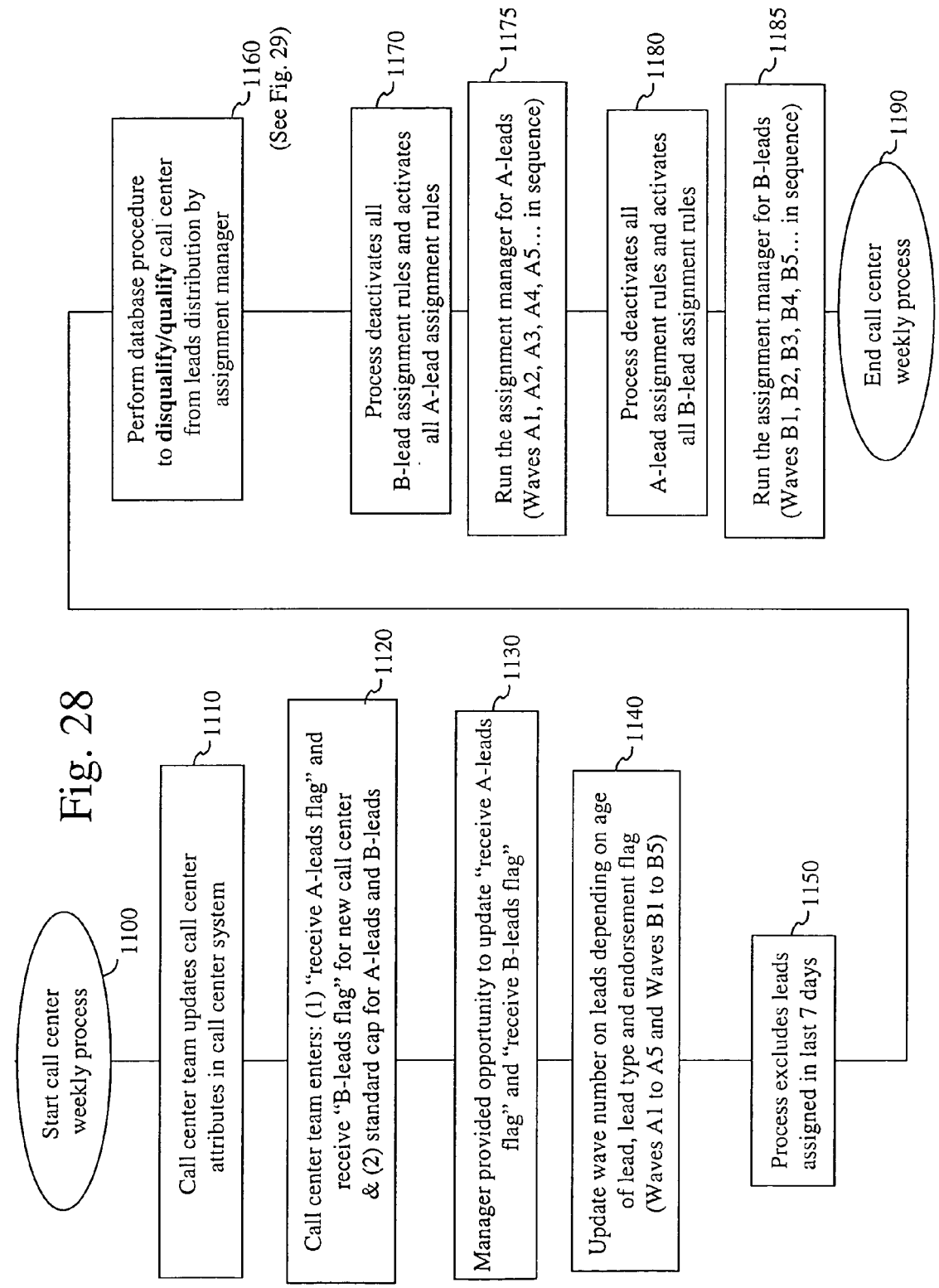
FIG. 28 is a flowchart showing a weekly call center process in accordance with one embodiment of the invention.

Now turning to further aspects of the invention, as described above with reference to FIG. 8 and FIG. 11, a lead or a set of leads may be forwarded to a call center for processing, instead of being processed by an agent. In accordance with one embodiment of the invention, FIG. 28 is a flowchart showing a call center process. The process of FIG. 28 may be performed on a weekly basis or at some other predetermined time interval.

The process of FIG. 28 starts in step 1100 and passes to step 1110. In step 1110, a call center team, i.e., the team that is responsible for maintenance of the call center processing, updates the call center attributes in the lead processing portion. For example, the call center attributes might dictate a status that is accorded to a particular call center, as described below. In the case of a new call center, the call center team would add the new call center along with the attributes associated with the new call center, in accordance with one embodiment of the invention. After step 1110, the process passes to step 1120.

In step 1120, the call center team may illustratively set flags as desired, including setting to positive the "receive A-leads flag" and the receive "B-leads flag". Further, the call center team selects a cap value or values, for A-leads and B-leads, from a list of options for cap values. As described below, the particular selected cap value dictates the particular set of rules that are used to process leads in the call center.

Then, in step 1130, the appropriate sales management person is provided an opportunity to update the "receive A-leads flag" and the "receive B-leads flag." For example, the sales manager might choose to deactivate the A-lead flag if the sales management person for some reason does not want the particular call center to receive A-leads.

Then, the process passes to step 1140. In step 11140, the wave number on leads is updated, as desired, depending on the age of the lead, lead type and endorsement flag, for example. This updating may be performed in a group fashion such as by searching all endorsed leads that are 10 days old, and assigning a particular wave number to each of such leads. Then, in step 1150, the process excludes leads that have been assigned in the last 7 days, for example. That is, the process of Fig. A allows a lead a predetermined time for the lead to be released for working (after a prior assignment). That is, in this case 7 days is provided before the lead will again be available for reassignment. Accordingly, if a sales manager does not release a lead for working (after the lead has been assigned), the lead will be reassigned by the process of FIG. 28 after 7 days.

After step 1150, the process passes to step 1160. In step 1160, the process performs a database procedure to disqualify or qualify the particular call center from leads distribution by assignment manager. Further details of step 1160 are shown in FIG. 29.

After step 1160 of FIG. 28, the process passes to step 1170. In step 1170, the process deactivates all B-lead assignment rules and activates all A-lead assignment rules. Then, in step 1175, the process runs the assignment manager for all the A-leads. Specifically, the process assigns the A-leads in sequential waves A1, A2, A3, A4, and A5, for example.

Then, in step 1180, the process deactivates all A-lead assignment rules and activates all B-lead assignment rules. Then, in step 1185, the process runs the assignment manager for the B-leads in sequential waves B1, B2, B3, B4, and B5, for example. After step 1185, the process passes to step 1190. In step 1190, the weekly process ends. Aspects of waves, which may be applied in the processing of FIG. 28, are described above with reference to FIG. 7.

FIG. 29 is a flowchart showing further details of the "perform database procedure to disqualify/qualify call center from leads distribution by the assignment manager." The subprocess starts in step 1160 and passes to step 1162. In step 1162, the process determines whether the: "call center cap>0", i.e., can the call center receive leads. That is, the process determines whether the particular call center is designated to receive leads. If No, then the process passes to step 1163 and then on to step 1166.

Alternatively, the process in step 1162 may have determined that the particular call center cap is indeed greater than zero, i.e., the call center is qualified to receive leads. Accordingly, the process passes to step 1164.

In step 1164, the process matches processing of leads in the call center to a set of appropriate call center rules. To explain, the set of rules that are used is based on the particular cap value that is selected by the sales management person, for example. That is, once the user selects the desired cap value, the other rules, which are used in the processing of the leads are automatic, in accordance with one embodiment of the invention. Accordingly, the simple selection of a cap value for a particular call center dictates a variety of parameters that are used in processing leads in that call center. For example, the selection of the cap value will of course dictate the cap value for the call center, as well as the assignment of leads in waves, the rate at which leads are assigned, or any other parameter, as desired. After step 1164, the process passes to step 1166. In step 1166, the subprocess ends, i.e., the process returns to step 1170 of FIG. 28.

Accordingly, the processing of FIG. 28 and FIG. 29 allow leads to be forwarded and processed by call centers in an efficient manner. The rules that are associated with a particular cap value may be varied as desired. For example, with higher cap values, the rules will typically be varied to reflect the increased volume that the particular call center (with the higher cap value) will experience.

Hereinafter, further aspects relating to the processing of leads will be described and in particular relating to the general implementation of the above systems and methods of the invention.

It is appreciated that a variety of off-the-shelf software might be used to implement various pieces of the above described systems and methods in the embodiments of the invention. For example, various communication software might be utilized. Further, as should be apparent to one of ordinary skill in the art, various customer relationship management software may be used to implement different pieces of the above embodiments as underlying technology. For example SIEBLE's customer relationship management software might be used as underlying technology.

As described above, FIGS. 1-4 show one embodiment of the system of the invention. Further, various processes are described in detail. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Hereinafter, various embodiments and aspects of the invention will be described in summary. In accordance with one embodiment, the invention provides a method, and system for performing the method, for processing leads, including obtaining a lead, the lead including lead information; classifying the lead based on the lead information; generating a pool of candidate agents, which are selected from a collection of possible agents, that are eligible to work the lead based on the classifying of the lead; selecting a selected agent from the pool of candidate agents, the selected agent designated to work on the lead; and outputting lead information so as to be accessible to the agent over a network environment, such as the Internet, to a lead distribution portion. The method may further include the step of obtaining agent information regarding each agent; and generating a pool of agents, which are selected from a collection of possible agents, that are eligible to work the lead also includes considering the agent information regarding each agent. The method may further include processing the agent information, for each agent, to determine an agent score for each agent, the agent score being included in the considering the agent information regarding each agent. The classifying the lead based on the lead information may include determining if the lead is auto-assignable; and generating a pool of candidate agents and selecting a selected agent from the pool of candidate agents are only performed for leads that are designated as auto-assignable. The method may include classifying the lead based on the lead information including determining if the lead is an A-lead or a B-lead. The classifying the lead based on the lead information may include determining if the lead is an endorsed lead or a non-endorsed lead. Generating the pool of candidate agents may include determining the number of leads that each agent has in their inventory. The method may include, wherein the lead information includes a territory that the lead is associated with, generating the pool of candidate agents including determining whether each agent is available in the particular territory of the lead. The method may further include determining whether telemarketing possesses a priority over the lead; and determining that telemarketing does not possesses a priority over the lead so as subsequently perform the selecting a selected agent from the pool of candidate agents. The step of selecting a selected agent from the pool of candidate agents may include determining whether each agent is a new agent or an experienced agent. The method may further include the step of randomly assigning the lead between a number of competing agents in the pool of agents. The lead distribution office may be in the form of a web based lead system.

In accordance with a further embodiment, the invention includes a method, and system for performing the method, for distributing leads to an agent in a network environment, the method comprising outputting information regarding a new lead from a lead processing portion to a lead distribution portion over the network environment; accessing the lead distribution portion, by an agent, to obtain information regarding the new lead; and outputting the information regarding a new lead from the lead distribution portion to the agent. The method may further include the lead distribution portion requesting the agent to enter verification information regarding the agent prior to the lead distribution portion outputting the information regarding a new lead to the agent; and wherein the verification information includes a password. The lead distribution portion may further include outputting information regarding a collection of leads of the agent, in addition to the lead distribution portion outputting information regarding a new lead. The method may further include the lead distribution portion outputting information regarding activities of the agent, in addition to the lead distribution portion outputting information regarding the new lead. The method may include the lead distribution portion outputting information regarding the calendar of the agent, in addition to the lead distribution portion outputting information regarding the new lead, wherein the outputting of information regarding the calendar of the agent includes outputting at least one of a daily, weekly and monthly schedule of the agent. The method may further include tracking the new lead as the lead is worked on by the selected agent so as to generate worked-on lead information, the worked on lead information being input by the agent into the lead distribution portion, the lead distribution portion then outputting the worked-on lead information to the lead processing portion. The worked-on lead information may include confirmation of a sale as a result of the lead. The method may further include determining an agent lead credit balance, for each agent, based on the worked-on lead information obtained from a plurality of leads; and outputting the agent lead credit balance, for each agent, from the lead distribution portion to the leads processing portion. The invention may be practiced in a network environment, such as using the Internet. The lead distribution portion may be a web based lead system.

In accordance with one embodiment of the invention, the automated lead management system may use disposition rules. This process automates the handling of sales leads based on the last "disposition" (or outcome) as provided by an agent or decided by management. The disposition code segments the "worked" leads. Each segment is then automatically handled/queued in an appropriate way commensurate with its now designated value. In accordance with one embodiment of the invention, a rule table may be used.

In accordance with some embodiments, the invention also provides for auto-disposition of sales leads. That is, when lead inventory is not made available for reworking in a timely fashion, "auto-disposition" will designate a "pseudo" outcome automatically removing the sales lead from the assignee's inventory, making the lead immediately available for rework by another agent, for example. That is, for example, an agent may be expected to work a lead in 30 days. If such a lead remains in the agent's inventory for 60 days, and has not been worked by the agent, then that lead may be subjected to auto-disposition. The lead will be placed back into the auto-assignment and distribution method of the invention.

In accordance with some embodiments, the invention also provides for "Auto-Aging" of leads, i.e., for leads to sleep. That is, when appropriate, some dispositions of a lead (when subjected to the auto-disposition process) will automatically trigger a lead into a "sleep" stage. This auto-aging of the lead will ensure that a lead is only reworked after a designated amount of time has passed. That is, the lead will then be worked at a later date that will more likely result in conversion of that lead.

In accordance with one embodiment of the invention, the systems and methods of the invention may perform a "new lead validation process." The new lead validation process relates in particular to "agent generated business," i.e., leads that are generated by an agent. The new lead validation process takes new leads as entered by a sales agent, for example, and compares the information of the new lead against an established marketing responder database, or another lead database, that stores existing lead information.

Any "matches" are not immediately loaded to the established marketing responder database, or other lead database, but instead coded as a "duplicate" lead. Then, agent management and sales management, for example, review and compare the duplicate "agent generated" lead with the established responder, and may perform other analysis, to determine the agent's entitlement to the lead as an "agent generated" lead. The "agent generated" lead may typically result in a higher commission rate for the agent. Any non-matches, i.e., leads that are decided to indeed constitute agent generated business, are automatically loaded with coding designating the lead as an "agent generated" lead, and thus resulting in a higher commission rate for the agent upon sale of that lead.

The systems and methods of the invention, in accordance with various embodiments of the invention, provide for the automated assignment of sales leads. Sales leads are automatically "matched" to sales agents to optimize conversion of the opportunity presented by the agent and, as a result, maximizing sales premium to the business. The "automated assignment of sales leads" business processes leverages a variety of unique factors when matching a lead to an agent.

One factor that may be used when performing the automated assignment of sales leads may be characterized as using lead exclusion flow for auto-assignment, i.e., the process ensures that only leads with optimal opportunity to convert are assigned as part of the "automated assignment" process. Various attributes of a lead may be used in this determination such as whether the lead has been transferred between regions and whether the lead's resurrection date has been reached, i.e., the date at which a previously retrieved lead is retrieved to be worked again. Waves may be used, as described above.

Another factor that may be used when performing the automated assignment of sales leads may be characterized as an agent exclusion flow for auto-assignment. Implementation of this process ensures that only agents with appropriate attributes are assigned leads as part of the "automated assignment" process.

Another factor that may be used when performing the automated assignment of sales leads may be characterized as agent performance profile (agent scoring model). This process calculates the relative likelihood of an agent converting a lead. When 2 or more agents are "eligible to receive a lead" per the "agent exclusion flow for auto-assignment" processes described above, the implementation of this unique "scoring model" ensures that the "agent most likely to convert the lead" receives the lead.

Another factor that may be used when performing the automated assignment of sales leads may be characterized as assignment waves. This process segments eligible leads and then prioritizes the segments to ensure leads with optimal opportunity to convert are assigned first, as part of the "automated assignment" process.

In accordance with embodiments of the invention, the systems and methods provide for auto-assignment for large lead volumes to a large number of users. Position, along with new business rules and logic, significantly reduce the time to assign leads to call centers. Further, in accordance with one embodiment of the invention, each territory may be set at a lead "cap" limit based upon a standard selection of a variety of values. This provides flexibility in choosing what is the appropriate lead cap limit based on territory. These values can be changed and are selected for each territory for each type of lead, i.e., A and B leads.

There is also provision provided for manual assignment of leads where necessary, and ability for sales support leaders and regional office managers to overwrite the recommended agent.

In accordance with various embodiments of the invention, the systems and methods provide a variety of features described above. These features also include providing limited content on the home page to speed up page response time. This may include summarized metrics to focus on agent performance thru awareness. Further, a leads detail page displays all information on one page thereby not requiring users to toggle back and forth to get all the necessary information from both the leads detail and leads list pages, as described above. The systems and methods of the invention may also provide for automatically populating primary producer code on the leads list edit page. Further, the creation of dispositions or activities requires only one click by the user. Further features include a print leads page that can print up to 50 leads with one click, a sold leads page that separates inactive versus active inventory, and work baskets that may be used to eliminate the need for user queries. A wide variety of other features are provided by the systems and methods of the invention, as described herein.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method of assigning sales leads in a network environment, the sales leads relating to persons interested in effecting a purchase, the method comprising:
   obtaining a lead, the lead including lead information relating to a person interested in effecting a purchase;
   loading the lead into a lead processing portion;
   determining, by the lead processing portion, if the lead is auto-assignable by initiating an auto-assignment process;
   in the event the lead is auto-assignable, assigning the lead to a sales agent having a leads credit balance above a minimum value, wherein sales agents having a leads credit balance below a minimum value are removed from being considered as a potential recipient, the leads credit balance is automatically generated by the lead processing portion based on leads that an agent has converted to sales and a number of new leads that the agent has obtained, the converted leads adding to the lead credit balance and the new leads detracting from the lead credit balance; and outputting the lead information over the network environment to a lead distribution portion, so as to be accessible to the sales agent; and
   in the event the lead is not auto-assignable, ending the auto-assignment process.

2. The method of claim 1, wherein the determining if the lead is auto-assignable includes determining if the lead is an agent generated lead, the agent generated lead resulting from efforts by the sales agent, wherein the lead is assigned in the event the lead is deemed auto-assignable and ending the auto-assignment process in the event the lead is not deemed auto-assignable.

3. The method of claim 1, wherein the determining if the lead is auto-assignable includes determining if the lead has been transferred from a first region to a second region, the second region being a current region in which the lead is being worked, wherein the lead is assigned in the event the lead is deemed auto-assignable and ending the auto-assignment process in the event the lead is not deemed auto-assignable.

4. The method of claim 1, wherein the determining if the lead is auto-assignable includes determining if the lead is associated with an appointment set by a lead call center, wherein the lead is assigned in the event the lead is deemed auto-assignable and ending the auto-assignment process in the event the lead is not deemed auto-assignable.

5. The method of claim 1, wherein the determining if the lead is auto-assignable includes the lead processing portion determining if a resurrection date of the lead has been reached, wherein the lead is a lead that has been previously worked by a sales agent, wherein the lead is assigned in the event the lead is deemed auto-assignable and ending the auto-assignment process in the event the lead is not deemed auto-assignable.

6. The method of claim 1, further comprising removing a sales agent from being considered as a potential recipient in the event a leads inventory of the sales agent has reached a maximum value.

7. The method of claim 1, wherein the assigning the lead to a sales agent further includes determining the number of leads that a particular agent has received in a current time period.

8. The method of claim 1, wherein an amount that a particular converted lead adds to the lead credit balance is based on a premium associated with the particular converted lead, and wherein the premium associated with the leads varies between different leads.

9. The method of claim 1, wherein the lead distribution portion is a web based lead system.

10. The method of claim 1, wherein the assigning the lead to a sales agent includes:
    generating an agent score for each agent that is a candidate for assignment of the lead; and
    assigning the lead to the agent with the highest agent score, wherein the agent score being based on past performance of a respective agent.

11. The method of claim 10, wherein the agent score of a particular agent is based on conversion of leads to sales by the particular agent, the percentage of the agent's business that is generated by that particular agent, and position rank of the particular agent.

12. The method of claim 10, further including, wherein two agents have the same agent score, randomly assigning the lead between such two agents.

13. The method of claim 1, wherein the network environment includes the Internet.

14. The method of claim 1, wherein the assigning the lead to a sales agent includes:
    generating a pool of candidate agents, which are selected from a collection of possible agents, that are eligible to work the lead based on the lead information; and
    selecting a selected agent from the pool of candidate agents, the selected agent designated to work on the lead.

15. The method of claim 1, wherein the lead information includes information regarding endorsements associated with the lead and the territory to which the lead is associated.

16. The method of claim 15, wherein the assigning the lead to a sales agent further includes obtaining agent assignment criteria of each agent that is a candidate for assignment of the lead, the agent assignment criteria being compared to the information regarding endorsements associated with the lead and the territory to which the lead is associated.

17. The method of claim 1, wherein the method further includes determining whether telemarketing possesses a priority over the lead, telemarketing being a call center; and
determining that telemarketing does not possesses a priority over the lead so as subsequently perform the assigning the lead to the sales agent.

18. The method of claim 17, further including:
determining that telemarketing has priority over a second lead; and
assigning the second lead to a particular telemarketing facility, the assigning determining whether candidate call centers are below a lead cap.

19. The method of claim 1, wherein the lead processing portion, subsequent to loading the lead, outputs leads for assignment in waves, the waves including at least a first wave of leads that is assigned prior to subsequent waves of leads, wherein the lead processing portion determines in which wave a lead is assigned based on the lead information.

20. The method of claim 19, wherein the lead processing portion assigns all endorsed A-leads in the first wave and assigns non-endorsed A-leads in subsequent waves.

21. The method of claim 19, wherein the lead processing portion assigns B-leads to the subsequent waves.

22. The method of claim 21, wherein the lead processing portion assigns B-leads to a plurality of the subsequent waves, the lead processing portion assigning the B-leads to different waves in the plurality of waves based on age of the B-lead.

23. The method of claim 19, wherein the assigning the leads to waves includes associating a wave code with each lead to be included in an assignment wave, the wave code indicating which wave the particular lead is to be included.

24. The method of claim 19, wherein the lead processing portion assigns A-leads to respective waves based on the age of the A-lead.

25. A computer-implemented system for assigning sales leads in a network environment, the sales leads relating to persons interested in effecting a purchase, the computer-implemented system comprising:
a data entry portion through which a lead is obtained, the lead including lead information relating to a person interested in effecting a purchase, the data entry portion in the form of a processing machine; and
a lead processing portion into which the lead is loaded from the data entry portion, the lead processing portion determining if the lead is auto-assignable, by initiating an auto-assignment process in the event the lead is auto-assignable, assigning the lead to a sales agent having a leads credit balance above a minimum value, wherein sales agents having a leads credit balance below a minimum value are removed from being considered as a potential recipient, the leads credit balance is automatically generated by the lead processing portion based on leads that an agent has converted to sales and a number of new leads that the agent has obtained, the converted leads adding to the lead credit balance and the new leads detracting from the lead credit balance; and the lead processing portion outputting the lead information over the network environment to a lead distribution portion, so as to be accessible to the sales agent; and in the event the lead is not auto-assignable, ending the auto-assignment process.

26. The computer-implemented system of claim 25, wherein the lead processing portion determining if the lead is auto-assignable includes determining if the lead is an agent generated lead, the agent generated lead resulting from efforts by the sales agent, wherein the lead is assigned in the event the lead is deemed auto-assignable and ending the auto-assignment process in the event the lead is not deemed auto-assignable.

27. A method of assigning sales leads in a network environment, the sales leads relating to persons interested in effecting a purchase, the method comprising:
obtaining a lead, the lead including lead information relating to a person interested in effecting a purchase;
loading the lead into a lead processing portion;
determining, by the lead processing portion, if the lead is auto-assignable by initiating an auto-assignment process;
in the event the lead is auto-assignable, assigning the lead to a sales agent having a leads credit balance above a minimum value, wherein sales agents having a leads credit balance below a minimum value are removed from being considered as a potential recipient, the leads credit balance is automatically generated by the lead processing portion based on leads that an agent has converted to sales and a number of new leads that the agent has obtained, the converted leads adding to the lead credit balance and the new leads detracting from the lead credit balance; and
outputting the lead information over the network environment to a lead distribution portion, so as to be accessible to the sales agent; and
in the event the lead is not auto-assignable, ending the auto-assignment process;
wherein the determining if the lead is auto-assignable includes determining if the lead is an agent generated lead, the agent generated lead resulting from efforts by the sales agent, wherein the lead is assigned in the event the lead is deemed auto-assignable and ending the auto-assignment process in the event the lead is not deemed auto-assignable;
wherein the determining if the lead is auto-assignable includes the lead processing portion determining if a resurrection date of the lead has been reached, wherein the lead is a lead that has been previously worked by a sales agent, wherein the lead is assigned in the event the lead is deemed auto-assignable and ending the auto-assignment process in the event the lead is not deemed auto-assignable.

* * * * *

UNITED STATES PATENT AND TRADEMARK OFFICE
CERTIFICATE OF CORRECTION

PATENT NO. : 7,599,842 B2  Page 1 of 1
APPLICATION NO. : 10/602923
DATED : October 6, 2009
INVENTOR(S) : Tivey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1529 days.

Signed and Sealed this

Twenty-eighth Day of September, 2010

David J. Kappos
*Director of the United States Patent and Trademark Office*